(12) United States Patent
Kwan et al.

(10) Patent No.: US 10,018,882 B2
(45) Date of Patent: Jul. 10, 2018

(54) CONDUCTIVE INTERFACE FOR A LIGHT ADJUSTMENT SHEET

(71) Applicants: Bernard Kok Yien Kwan, El Cerrito, CA (US); Winston Cheng, El Cerrito, CA (US)

(72) Inventors: Bernard Kok Yien Kwan, El Cerrito, CA (US); Winston Cheng, El Cerrito, CA (US)

( * ) Notice: Subject to any disclaimer, the term of this patent is extended or adjusted under 35 U.S.C. 154(b) by 0 days.

(21) Appl. No.: 15/201,343

(22) Filed: Jul. 1, 2016

(65) Prior Publication Data

US 2017/0023820 A1    Jan. 26, 2017

Related U.S. Application Data

(63) Continuation of application No. 14/082,609, filed on Nov. 18, 2013, now Pat. No. 9,385,441.

(30) Foreign Application Priority Data

| Feb. 4, 2013 | (CN) | 2013 1 0043586 |
| Feb. 4, 2013 | (CN) | 2013 2 0063364 U |
| Feb. 4, 2013 | (CN) | 2013 2 0063378 U |
| Feb. 4, 2013 | (CN) | 2013 2 0063393 U |
| Mar. 8, 2013 | (CN) | 2013 2 0111659 U |
| Apr. 12, 2013 | (CN) | 2013 2 0198426 U |
| Apr. 12, 2013 | (CN) | 2013 2 0198454 U |

(51) Int. Cl.
*G02F 1/1345* (2006.01)
*H01R 4/2404* (2018.01)
(Continued)

(52) U.S. Cl.
CPC ....... *G02F 1/13452* (2013.01); *H01R 4/2404* (2013.01); *H01R 24/66* (2013.01); *H01R 2103/00* (2013.01)

(58) Field of Classification Search
CPC .......... B29C 45/1671; B29C 45/14639; B32B 17/10; B32B 17/10788; B32B 17/10174; B32B 17/10036; B60R 1/00; H01B 1/22; H01R 4/2404; H01R 4/24; H01R 24/66; H01R 2103/00; H05K 3/361; Y10T 29/4913; H02J 9/00; G02F 1/13; G02F 1/1334; G02F 1/1345; G02F 1/13452
(Continued)

(56) References Cited

U.S. PATENT DOCUMENTS

| 2,534,881 A | 12/1950 | Schroeder |
| 3,522,474 A * | 8/1970 | Piel David ............. G09F 13/28 313/318.01 |
| 5,122,215 A | 6/1992 | Shibata et al. |
| 5,168,387 A * | 12/1992 | Asakura ............. G02F 1/13452 349/152 |

(Continued)

*Primary Examiner* — Timothy Thompson
*Assistant Examiner* — Guillermo Egoavil

(57) ABSTRACT

Embodiments of an apparatus for connection to a light adjustment sheet and conductive interfaces for connection to a light adjustment sheet are described. In one embodiment, an apparatus for connection to a light adjustment sheet include a power source interface configured to be connected to a power source and a sheet interface electrically connected to the power source interface. The sheet interface is configured to connect to the light adjustment sheet such that electricity can be conducted from the power source interface to the light adjustment sheet to switch the light adjustment sheet between different visibility states. Other embodiments are also described.

5 Claims, 18 Drawing Sheets

(51) Int. Cl.
*H01R 24/66* (2011.01)
*H01R 103/00* (2006.01)

(58) Field of Classification Search
USPC ........ 174/74 R, 75 R; 29/831, 832; 349/150,
349/152, 86, 149; 439/72; 264/250;
359/276, 296, 266, 227
See application file for complete search history.

(56) References Cited

U.S. PATENT DOCUMENTS

| | | | |
|---|---|---|---|
| 6,044,062 A | 3/2000 | Brownrigg et al. | |
| 6,601,838 B1 * | 8/2003 | Gilley | B25B 7/02 269/228 |
| 7,103,511 B2 | 9/2006 | Petite | |
| 7,372,534 B2 * | 5/2008 | Yano | B32B 17/10 349/149 |
| 2005/0190331 A1 * | 9/2005 | Yano | B32B 17/10 349/142 |
| 2005/0190332 A1 * | 9/2005 | Yano | B32B 17/10 349/149 |
| 2006/0061008 A1 * | 3/2006 | Karner | B29C 45/0017 264/250 |
| 2007/0131956 A1 * | 6/2007 | Lin | H01L 33/60 257/98 |
| 2008/0280087 A1 | 11/2008 | Wu | |
| 2010/0047593 A1 | 2/2010 | Higashida et al. | |
| 2010/0177025 A1 | 7/2010 | Nagata et al. | |
| 2011/0188122 A1 * | 8/2011 | Habibi | B60R 1/08 359/604 |
| 2015/0355519 A1 * | 12/2015 | Vasiliev | B29D 11/00634 359/266 |

\* cited by examiner

CONDUCTIVE INTERFACE FOR A LIGHT ADJUSTMENT SHEET

CROSS-REFERENCE TO RELATED APPLICATION

This application is entitled to the benefit of Chinese Patent Application Number 201320063364.5, Chinese Patent Application Number 201320063378.7, Chinese Patent Application Number 201320063393.1, and Chinese Patent Application Number 201310043586.5, all filed on Feb. 4, 2013, Chinese Patent Application Number 201320111659.5, filed on Mar. 8, 2013, Chinese Patent Application Number 201320198454.5, filed on Apr. 12, 2013, and Chinese Patent Application Number 201320198426.3, filed on Apr. 12, 2013, the disclosures of which are incorporated by reference herein in its entirety.

FIELD OF THE INVENTION

Embodiments of the invention relate generally to electronic hardware and methods, and, more particularly, to light adjustment sheet systems and conductive interfaces for light adjustment sheets.

BACKGROUND OF THE INVENTION

A light adjustment sheet, also known as a light switchable sheet or a switchable sheet, is an electronically controllable sheet that can be switched between different visibility states in response to an electrical potential. For example, switchable films can be attached to windows of, for example, buildings, airplanes, ships, and vehicles. A switchable sheet can not only provide user privacy, but can also block harmful ultraviolet and infrared light. A conductive interface is required to connect a switchable sheet to a power source so that the sheet can be switched between different visibility states. However, conventional conductive interfaces generally cannot assure the simplicity of connecting the conductive interface to a switchable sheet and the reliability of the electrical connection to the switchable sheet.

Conventional conductive interfaces are typically pre-fixed onto pre-cut switchable sheets at the manufacturer's site. Consequently, an end user of such a switchable sheet cannot adjust the location of the electrodes in the switchable sheet, which limits the ability of the end user to customize the shape/size of the switchable sheet. Alternatively, some conventional conductive interfaces require complex/expert manipulation of the switchable sheet to connect the interface to the sheet. For example, some interfaces require a user to cut open a switchable film to expose electrical terminals that are connected to electrical cables. Consequently, conventional conductive interfaces do not allow end users to self install switchable sheets in locations with varying shapes and sizes.

SUMMARY OF THE INVENTION

Embodiments of an apparatus for connection to a light adjustment sheet and conductive interfaces for connection to a light adjustment sheet are described. In one embodiment, an apparatus for connection to a light adjustment sheet include a power source interface configured to be connected to a power source and a sheet interface electrically connected to the power source interface. The sheet interface is configured to connect to the light adjustment sheet such that electricity can be conducted from the power source interface to the light adjustment sheet to switch the light adjustment sheet between different visibility states. In contrast to electrodes that are pre-fabricated onto a light adjustment sheet, the apparatus can be connected to a light adjustment sheet at the user location. The apparatus replaces costly pre-fabricated electrodes and allows the light adjustment sheet to be shipped in a clean sheet whereby an end-user is free to customize the light adjustment sheet by cutting the light adjustment sheet into any size or shape and to install the light adjustment sheet in any suitable location. Other embodiments are also described.

In one embodiment, a conductive interface for connection to a light adjustment sheet includes a housing containing a socket configured to be connected to a power cable and a conductive blade electrically connected to the socket through electrical wires inside the housing. The conductive blade is configured to be inserted into a side surface of the light adjustment sheet such that electricity can be conducted from the power cable to the light adjustment sheet to switch the light adjustment sheet between different visibility states.

In one embodiment, a conductive interface for connection to a light adjustment sheet includes an electrical insulation housing and a conductive blade. The electrical insulation housing includes a head section that contains a socket configured to be connected to a power cable, a neck section that contains electrical wires and terminals connected to the socket, and a plate section that is used to secure the light adjustment sheet onto the conductive interface. The conductive blade is electrically connected to the socket through the electrical wires and terminals inside the housing. The conductive blade is configured to be inserted into a light adjustment layer of the light adjustment sheet located between electrical insulation layers of the light adjustment sheet such that electricity can be conducted from the power cable to the light adjustment sheet to switch the light adjustment sheet between different visibility states.

Other aspects and advantages of embodiments of the present invention will become apparent from the following detailed description, taken in conjunction with the accompanying drawings, depicted by way of example of the principles of the invention.

BRIEF DESCRIPTION OF THE DRAWINGS

Throughout the description, similar reference numbers may be used to identify similar elements.

DETAILED DESCRIPTION OF THE INVENTION

It will be readily understood that the components of the embodiments as generally described herein and illustrated in the appended figures could be arranged and designed in a wide variety of different configurations. Thus, the following detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

Figure 1:
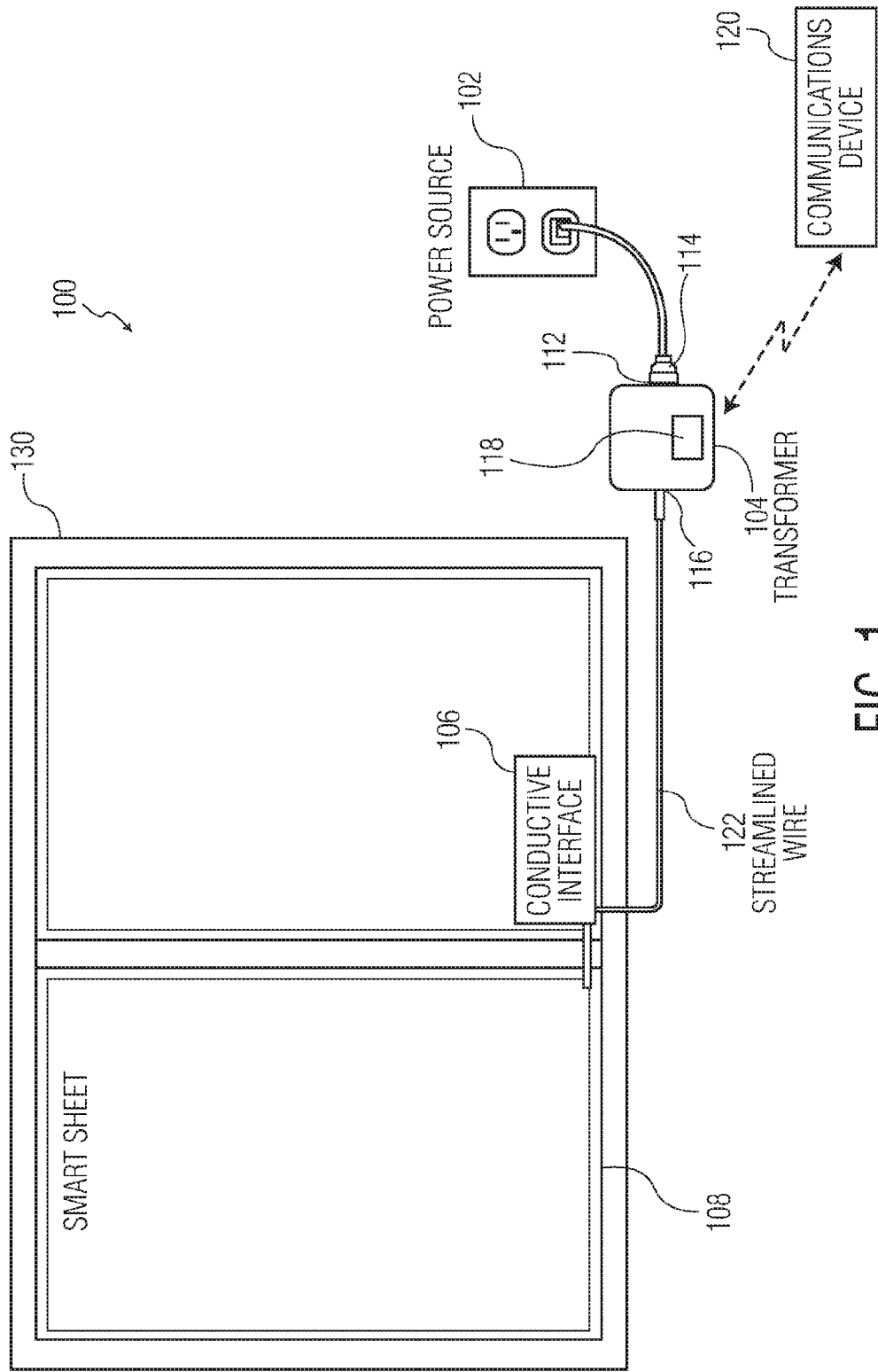
FIG. 1 is a schematic block diagram of a switchable sheet system in accordance with an embodiment of the invention.

FIG. 1 is a schematic block diagram of a switchable sheet system 100 in accordance with an embodiment of the invention. The switchable sheet system allows window panes or other surface areas to switch between different visibility states, including (but not limited to), between a transparent state and an opaque state, between a transparent state and a dimmed, darkened, or translucent state, between a transparent state and a mirror finish state, between a transparent state and a state of varying colors of the visible light spectrum, and between transparent, frosted, darkened and darkened frost states. The switchable sheet system can be used to provide privacy and to block ultraviolet and infrared light. The switchable sheet system can be used at a surface area 130, such as a window pane or other surface area of, for example, buildings, airplanes, ships and vehicles and in offices, bungalows, banks, and various commercial projects.

In the embodiment depicted in FIG. 1, the switchable sheet system 100 includes a power source 102, a transformer 104, a conductive interface 106, and a light adjustment sheet 108, which is also known as a (light) switchable sheet. The conductive interface 106 can be wrapped in electrical insulation rubber or other electrical insulation material. Although the switchable sheet system is depicted in FIG. 1 as including certain components, in other embodiments, the switchable sheet system may include more components or fewer components to realize more or less functionalities.

The switchable sheet 108 is an electronically controllable sheet that can be switched between different visibility states in response to an electrical potential or other triggering signal/indicator/message. Examples of visibility states include (without being limited to) a transparent state, an opaque state, a dimmed state, a darkened state, a translucent state, a state of varying colors of the visible light spectrum, a frosted state, a mirror finish state, and a darkened frost state. In one embodiment, a visibility state corresponds to a visual effect. In some embodiments, a visibility state corresponds to a degree of transparency of the switchable sheet (such as, the physical property of allowing the transmission of light through the switchable sheet). For example, a high visibility state corresponds to a high transparency while a low visibility state corresponds to a low transparency. Being more transparent corresponds to a higher visibility, while being less transparent corresponds to a lower visibility. In some embodiments, visibility states can relate to other visible effects, such as frosting or coloring. In some embodiments, in response to an electrical potential or other triggering signal/indicator/message, the switchable sheet 108 can be switched between states with different electromagnetic properties, different states that relate to other non-visible light spectrums, or any other suitable states.

The switchable sheet 108 has the ability to reflect, to absorb, or to refract light from the visible spectrum, ultraviolet and infrared spectrums. The switchable sheet is also known as a "smart sheet." In some embodiments, the switchable sheet is a switchable glass or a "smart glass." In some embodiments, the switchable sheet is a switchable film or a "smart film." However, the switchable sheet is not limited to smart glass or film. The switchable sheet can not only provide user privacy, but also block ultraviolet and infrared light. The switchable sheet can be attached to window panes or other surface areas of, for example, buildings, airplanes, ships and vehicles and in offices, bungalows, banks, and various commercial projects. For example, the switchable sheet may include an adhesive layer that can be exposed by a user to adhere the switchable sheet to a window pane. In another embodiment, the switchable sheet can be attached to a display surface, such as a cathode-ray tube (CRT), a liquid-crystal display (LCD), a plasma display panel (PDP), or a light-emitting diode (LED) display panel, of a Television (TV) set. In an example use case, switching the switchable sheet between an opaque state and a transparent state causes the display surface (e.g., a TV) to be covered or to be exposed. For example, a user can use an application (APP) on his/her smart phone or tablet to switch the switchable sheet to watch TV. In another embodiment, the switchable sheet can be attached to a display or exhibition device, such as a picture frame, a photograph frame, or a glass display apparatus. In an example use case, switching the switchable sheet between an opaque state and a transparent state causes an item displayed in a display or exhibition device to be covered or to be exposed. For example, a user can use an application (APP) on his/her smart phone or tablet to switch the switchable sheet to reveal a new painting or new product.

In an embodiment, the switchable sheet 108 is switched between a transparent state and an opaque state in response to an electrical potential. In the transparent state, the switchable sheet may have various degrees of transparency. For example, the switchable sheet may be of 5%, 10%, 20%, 30%, 40%, 50%, 60%, 70%, 80%, 90% transparency or any other suitable transparency level in the transparent state.

In another embodiment, the switchable sheet 108 is switched between a transparent state and a dimmed, darkened, or translucent state in response to an electrical potential. In the transparent state, the switchable sheet may have various degrees of transparency. For example, the switchable sheet may be of 5%, 10%, 20%, 30%, 40%, 50%, 60%, 70%, 80%, 90% transparency or any other suitable transparency level in the transparent state. In the dimmed, darkened, or translucent state, the switchable sheet may have various degrees of opacity. For example, the switchable sheet may be of 5%, 10%, 20%, 30%, 40%, 50%, 60%, 70%, 80%, 90% opacity or any other suitable opacity level in the dimmed, darkened, or translucent state.

In another embodiment, the switchable sheet 108 is switched between a transparent state and a state of varying colors of the visible light spectrum. In the transparent state, the switchable sheet may have various degrees of transparency. For example, the switchable sheet may be of 5%, 10%, 20%, 30%, 40%, 50%, 60%, 70%, 80%, 90% transparency or any other suitable transparency level in the transparent state. In the transparent state, the switchable sheet may be colorless or tintless. In the state of varying colors, the switchable sheet may be red, blue, yellow, green or of any other suitable color with any suitable saturation, shade, and luminosity.

In another embodiment, the switchable sheet 108 is switched between a transparent state, a frosted state, a darkened state and a darkened frost state. In the transparent state, the switchable sheet may have various degrees of transparency. For example, the switchable sheet may be of 5%, 10%, 20%, 30%, 40%, 50%, 60%, 70%, 80%, 90% transparency or any other suitable transparency level in the transparent state. In the frosted state, the switchable sheet may be translucent or have a blurring visual effect. In the darkened state, the switchable sheet may have various degrees of opacity. For example, the switchable sheet may be of 5%, 10%, 20%, 30%, 40%, 50%, 60%, 70%, 80%, 90% opacity or any other suitable opacity level in the darkened state. In the darkened frosty state, the switchable sheet may have various degrees of opacity and a blurring visual effect.

In another embodiment, the switchable sheet 108 is switched between a transparent state and a mirror finish state in response to an electrical potential. In the transparent state, the switchable sheet may have various degrees of transparency. For example, the switchable sheet may be of 5%, 10%, 20%, 30%, 40%, 50%, 60%, 70%, 80%, 90% transparency or any other suitable transparency level in the transparent state. In the mirror finish state, the switchable sheet becomes a mirror. In this embodiment, the switchable sheet can be used with a painting frame or any other suitable portrait. In an example use case, the switchable sheet is used in a hotel room or any other suitable location. For example, the switchable sheet with mirror finish can be used in front of a painting/portrait. In the off state, the switchable sheet is a typical full length mirror. However, when an occupant of the hotel room does not need the mirror, the occupant can switch the switchable sheet into a transparent state to reveal the painting/portrait behind the switchable sheet, for example, using an application (APP) on his/her smart phone or tablet.

In some embodiments, the switchable sheet 108 includes a light adjustment layer that is located (e.g., sandwiched) between two or more electrical conductive interior layers. The light adjustment layer may be in physical contact with the electrical conductive interior layers. The switchable sheet 108 may also include two or more electrical insulation exterior layers that are located outside electrical conductive interior layers. The electrical insulation exterior layers may be in physical contact with the electrical conductive interior layers.

In some embodiments, the switchable sheet 108 includes a mixture of adhesive material and liquid crystal, which is injected between two or more layers of electrical conducting films. In some embodiments, the switchable sheet 108 is a Polymer dispersed liquid crystal (PDLC) film.

Figure 2:
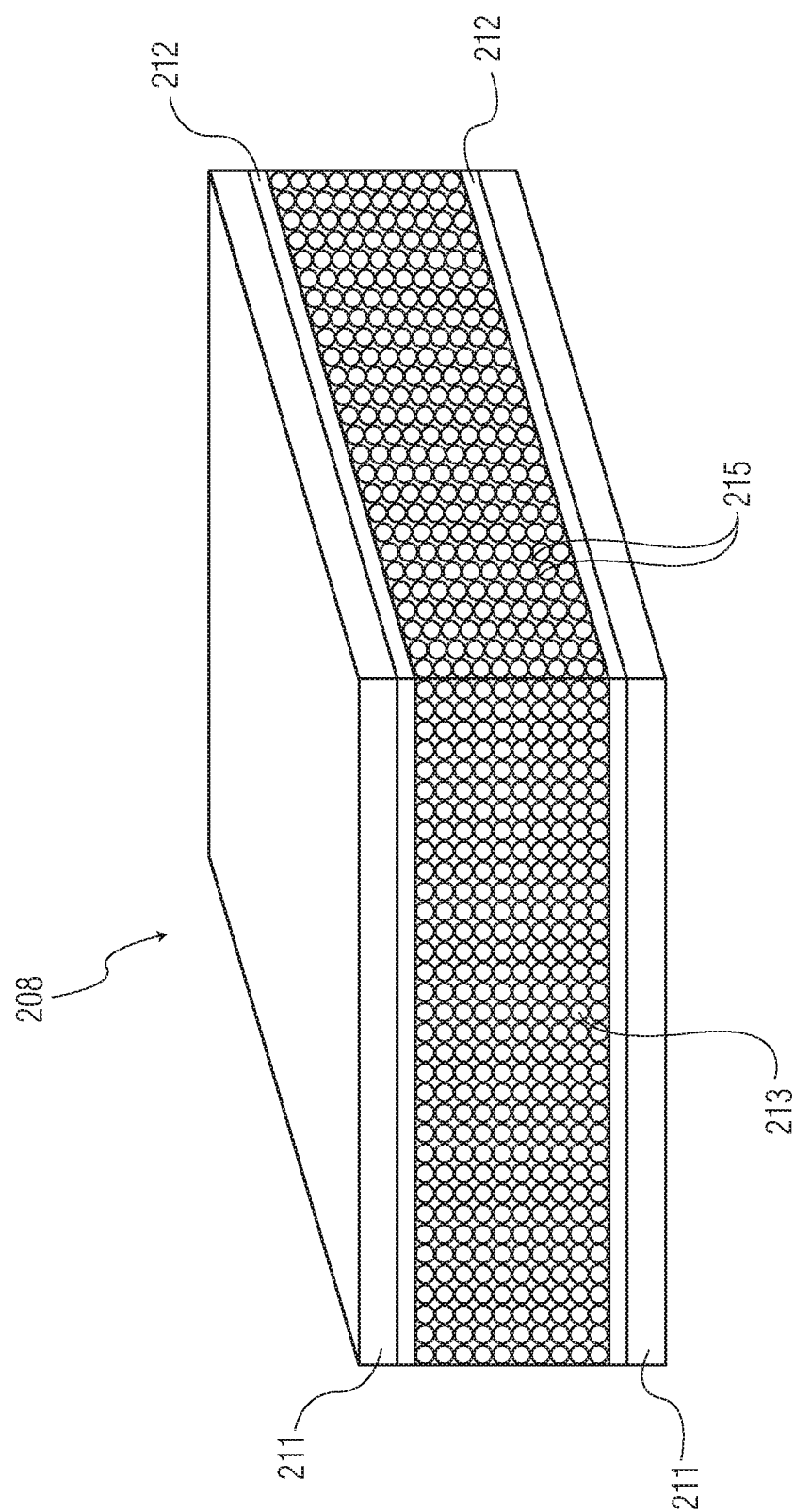
FIG. 2 depicts an embodiment of a switchable sheet depicted in FIG. 1.

FIG. 2 depicts a possible embodiment of the switchable sheet 108. However, the switchable sheet 108 is not limited to the embodiment depicted in FIG. 2. In the embodiment depicted in FIG. 2, a switchable sheet 208 includes two layers of electrical insulation material 211, two electrical terminal (i.e., conductive) layers 212, and a light adjustment layer 213. In some embodiments, the electrical insulation layers 211 and the electrical conductive layers 212 are transparent. In some embodiments, the light adjustment layer 213 includes a mixture layer of adhesive material and liquid crystals.

Although the switchable sheet 208 is depicted in FIG. 2 as including certain domination of layers, in other embodiments, the switchable sheet 208 may include more layers or fewer layers to realize more or less functionalities. In some embodiments, the switchable sheet 208 includes more than two layers of electrical insulation material 211, more than two electrical terminal (i.e., conductive) layers 212, and/or two or more light adjustment layers 213. For example, the switchable sheet 208 may include two light adjustment layers 213. One of the light adjustment layers can become frosted while the other one of the light adjustment layer darkens, allowing the switchable sheet 208 to switch between 4 potential states (i.e., transparent, frosted, darkened and darkened frost) in response to an electrical potential.

The electrical insulation layers 211 form the outside layer of the switchable sheet 208 and are not conductive. In an embodiment, each electrical insulation layer 211 has atypical thickness of around 0.01 mm-3 mm. For example, the thickness of the electrical insulation may be around 0.125 mm or 0.188 mm. However, the thickness of each electrical insulation layer 211 can be set to any suitable value and is not limited to the examples provided. In some embodiments, the electrical insulation layers have the same thickness. In other embodiments, each of the electrical insulation layers has a different thickness.

In some embodiments, the electrical insulation layers 211 are transparent with various degrees of transparency. For example, the electrical insulation layers may be of 5%, 10%, 20%, 30%, 40%, 50%, 60%, 70%, 80%, 90% transparency or any other suitable transparency level. In some embodiments, the electrical insulation layers have various degrees of opacity. For example, the electrical insulation layers may be of 5%, 10%, 20%, 30%, 40%, 50%, 60%, 70%, 80%, 90% opacity or any other suitable opacity level. In some embodiments, the electrical insulation layers are colorless or tintless. In some embodiments, the electrical insulation layers are red, blue, yellow, green or of any other suitable color with any suitable saturation, shade, and luminosity.

In some embodiments, the electrical insulation layers 211 may be made of one or more flexible (e.g., soft) materials. For example, the electrical insulation layers may be made of film. In some embodiments, the electrical insulation layers may be made of one or more rigid (i.e., hard) materials. For example, the electrical insulation layers may be made of glass. Materials that can be used as the electrical insulation exterior layers, include (but not limited), glass, Polyester (PES), Polyethylene terephthalate (PET), Polyethylene (PE), High-density polyethylene (HDPE), Polyvinyl chloride (PVC), Polyvinylidene chloride (PVDC), Low-density polyethylene (LDPE), Polypropylene (PP), Polystyrene (PS), High impact polystyrene (HIPS), Polyamides (PA), Acrylonitrile butadiene styrene (ABS), Polyethylene/Acrylonitrile Butadiene Styrene (PE/ABS), Polycarbonate (PC), Polycarbonate/Acrylonitrile Butadiene Styrene (PC/ABS), and/or Polyurethanes (PU). However, in other embodiments, the base material layers 211 can be made of other materials.

The two electrical terminal layers 212 provide conductivity throughout the switchable sheet 208. In one embodiment, each electrical terminal layer 212 has a typical thickness of around 10-200 nm. However, the thickness of each electrical terminal/conductive layer can be set to any suitable value and is not limited to the examples provided. In some embodiments, the electrical terminal layers are transparent with various degrees of transparency. For example, the electrical terminal layers may be of 5%, 10%, 20%, 30%, 40%, 50%, 60%, 70%, 80%, 90% transparency or any other suitable transparency level. In some embodiments, the electrical terminal layers have various degrees of opacity. For example, the electrical terminal layers may be of 5%, 10%, 20%, 30%, 40%, 50%, 60%, 70%, 80%, 90% opacity or any other suitable opacity level. In some embodiments, the electrical terminal layers are colorless or tintless. In some embodiments, the electrical terminal layers are red, blue, yellow, green or of any other suitable color with any suitable saturation, shade, and luminosity.

In some embodiments, the electrical terminal layers 212 are made of Indium Tin Oxide (ITO), Zinc oxide (ZnO) and/or graphene. For example, ITO is generally chosen and its thickness varies from less than 100 to several hundred nanometers (nm) with the degree of transparent up to 80%. However, in other embodiments, the electrical terminal layers 212 can be made of other materials.

The light adjustment layer 213 reacts to electrical polarity and is responsible for causing the switchable sheet to switch between different visibility states, including (but not limited to), between a transparent state and an opaque state, between a transparent state and a dimmed, darkened, or translucent state, between a transparent state and a state of varying colors of the visible light spectrum, and between transparent, frosted, darkened and darkened frost states. In one embodiment, the typical thickness of the light adjustment layer is 5-30 micrometers (μm). In the embodiment depicted in FIG. 2, the light adjustment layer is a mixture layer of adhesive material and liquid crystals. However, in other embodiment, the light adjustment layer is made of other materials. A description of physics behind the change of state of switchable sheet 208 is described below. In some embodiments, the light adjustment layer is made of Polymer dispersed liquid crystal (PDLC), electrochromic material, Suspended particle device (SPD) material, and/or liquid-crystal display (LCD). However, in other embodiments, the light adjustment layer can be made of other materials.

An example of the operation of the switchable sheet 208 is described as follows. When electricity is not applied to the switchable sheet 208, liquid crystal molecules 215 in the mixture layer of adhesive material and liquid crystals 213 remain in an opaque state because of the light dispersed effect of the liquid crystal. When electricity is applied to the transparent electrical terminal layers 212, the liquid crystals molecules are aligned in order. Because the refraction index of the liquid crystals is the same as the mixture of the adhesive material, light can pass through the switchable sheet 208 and the switchable sheet 208 is switched into a transparent state.

In some embodiments, the switchable sheet 208 is made of a sandwich layer of two plastic (or glass) sheets with PDLC (or other suitable crystal material) in between. Each plastic sheet is made up of a thin conductive layer of ITO on one side and a non-conducting layer of PET on the other side. In an embodiment, the switchable sheet includes two ITO electrical conducting layers with a thickness of 5~20 nanometers (nm), two PET plastic layers with a thickness of 0.15~0.25 mm, which are outside the two ITO electrical conducting layers, and a liquid crystal PDLC layer with a thickness of 15~30 μm, which is located between two ITO electrical conducting layers. In its natural, off-power state, PDLC crystals are dispersed randomly along the ITO layers, which block light from passing through the switchable sheet 208 and put an opaque tint on a window pane or other surface area on which the switchable sheet is attached. When a current passes through the ITO layers, PDLC crystals align due to the polarity effect, which allows light to pass through the switchable sheet 208 for a view of transparent window/surface.

Turning back to FIG. 1, the power source 102 is configured to supply electricity to the switchable sheet 108. The power source may be an electrical power supply that can supply a limited amount of electrical energy or an unlimited amount of electrical energy. The voltage and current level of the power source 102 can be at any suitable value. In the embodiment depicted in FIG. 1, the power source is a power outlet that is connected to an alternating current (AC) power supply. For example, the AC power supply is typically the power provided within a residential or commercial building with an input AC voltage of 110V/60 Hz or 230V or 240V/50 Hz or 60 Hz. Although some examples of AC voltage and frequency are provided, the voltage of the power source can be at any suitable value and is not limited to the examples provided. In some embodiments, the power source is a battery. For example, the power source includes at least one Alkaline battery, nickel-metal hydride battery, or any other suitable type of battery. In another example, the power source is a battery of a portable computing device, such as a cellular phone battery or a tablet computer battery.

The transformer 104 is configured to transform an input power signal from the power source 102 to an output signal. In the embodiment depicted in FIG. 1, the transformer is an AC transformer that can work with standard voltages in various countries and regions, including North America, Europe, Middle East, Central America and the Caribbean, South America, Africa, Australia and Oceania. In an embodiment, the AC transformer can transform an input AC voltage of 110V/60 Hz or 230V or 240V/50 Hz or 60 Hz into a suitable low AC voltage. For example, the AC transformer can transform an AC power input voltage of around 120V or 240V to an internal AC voltage of 5V or any suitable value. Although some examples of AC voltages are provided, the voltages of the transformer can be at any suitable value and are not limited to the examples provided. In some embodiments, the transformer is an AC to direct current (DC) transformer that transforms an AC input signal from the power source into a direct current (DC) voltage. For example, the AC to DC transformer can transform an AC power input voltage of around 120V or 240V to an internal DC voltage of 5V or any suitable value.

The transformer 104 can support a variety of connection interfaces. In the embodiment depicted in FIG. 1, the transformer 104 includes a Universal Serial Bus (USB) interface 112 that is connected to the power source 102 through a USB connector 114 and a power interface 116 that is connected to the conductive interface 106 through a streamlined electrical wire 122. Although the transformer is depicted in FIG. 1 as including a USB interface and a power interface, in other embodiments, the transformer may include other types of power interfaces. The power interface can support, for example, a 2.5 millimeter (mm) audio socket, a 3.5 mm audio socket, or any other suitable socket or interface. The streamlined wire 122 may be a 2.5 mm audio connector, 3.5 mm audio connector, or any other suitable connector. Although some examples of the dimensions of the power interface are provided, the dimensions of the power interface can be at any suitable value and are not limited to the examples provided.

In some embodiments, the transformer 104 includes a transceiver module 118 that is configured to wirelessly communicate with a communications device 120. The transceiver module may support at least one of various RF communications protocols, including without limitation, Bluetooth, ZigBee, Institute of Electrical and Electronics Engineers (IEEE) 802.11 wireless local area network (WLAN), HiperLAN (High Performance Radio LAN), Global System for Mobile communications (GSM), Universal Mobile Telecommunications System (UMTS), Code Division Multiple Access (CDMA), Worldwide Interoperability for Microwave Access (WiMax) and other communications protocols as defined by the 3rd Generation Partnership Project (3GPP), the 3rd Generation Partnership Project 2 (3GPP2), and 4G Long Term Evolution (LTE) standards bodies. Although some wireless communications protocols are identified herein, it should be understood that present disclosure is not limited to the cited wireless communications protocols. The transceiver module can operate in various licensed and unlicensed radio frequency (RF) frequency bands. In some embodiments, the transceiver module is a Near Field Communications (NFC) capable device. The communications device may have a wide range of mobility and portability. In an embodiment, the communications device is a handheld mobile device such as a cellular phone, a Smartphone, a Personal Digital Assistant (PDA), an Enterprise digital assistant (EDA), or a handheld gaming device. In another embodiment, the communications device is a portable computing device such as a laptop computer, a netbook computer, or a tablet computer. For example, the communications device may be a smartphone or tablet that remotely controls the switchable sheet system 100 to switch between different visibility states through an Application (APP).

In some embodiments, the switchable sheet system 100 includes a direct current (DC) to AC transformer configured to transform a DC power signal into an AC power signal. In an embodiment, the DC to AC transformer is used as an emergency power interface to supply power to the switchable sheet 108 in case the power source 102 and/or the transformer 104 fail. The DC to AC transformer can be used to ensure the normal functioning of the switchable sheet 108 during a power outage (power cut/blackout/power failure). For example, the DC to AC transformer can receive DC power signals from at least one solar cell and/or at least one battery unit. The solar cell, which is also known as a photovoltaic cell, is an electrical device that converts the energy of light into electricity by the photovoltaic effect. In an embodiment, the DC to AC transformer receives DC power signals from one or more solar panels. The battery unit includes a battery or a set of batteries. The battery unit may include one or more non-rechargeable batteries and/or one or more rechargeable batteries. Examples of batteries that can be used in the battery unit include (without being limited to), Alkaline batteries, Lithium batteries, solid-state batteries, Zinc-carbon batteries, fuel cells, Lead-acid batteries, Lithium-ion batteries, Nickel-cadmium batteries, and Nickel-zinc batteries. In an embodiment, the battery unit is an uninterruptible power supply (UPS). The DC to AC transformer may supply power to the switchable sheet 108 when a sensor unit detects a failure of the power source 102 and/or the transformer 104 and stop the supply of power to the switchable sheet 108 when the sensor unit detects the normal operation status of the power source 102 and/or the transformer 104. In one embodiment, the DC to AC transformer prefers renewable energy, such as solar energy, over non-renewable energy, such as Lead-acid batteries or other types of non-renewable batteries. For example, the DC to AC transformer may receive DC power signals firstly from a solar cell during a power outage. If the solar cell is out of power, the DC to AC transformer then receives DC power signals from a battery unit. Consequently, the DC to AC transformer allows the normal functioning of the switchable sheet 108 during a power outage over an extended period and during time periods in which solar energy is not feasible (e.g., during raining/cloudy days).

The conductive interface 106 is configured to be connected to the switchable sheet 108 by a user to switch the switchable sheet 108 between different visibility states. For example, a user can cut the switchable sheet 108 to desired shape and size, attach the switchable sheet 108 onto a window, and connect the conductive interface 106 to the switchable sheet 108. Conventional conductive interfaces do not allow end users to install a switchable sheet according to flexible dimension requirements and in variable locations. Some conventional conductive interfaces require electrodes to be pre-fabricated onto the switchable sheet during the manufacturing process. Alternatively, some conventional conductive interfaces require a user to cut open the switchable sheet so as to expose electrical terminals for connecting the switchable sheet to a power source using electrical cables. The conductive interface 106 replaces costly electrodes that are pre-fabricated onto the switchable sheet 108 and allows the switchable sheet 108 to be shipped in clean sheets or rolls and frees a manufacture from producing a switchable sheet to the exact size for the user. Therefore, a user is free to cut a switchable sheet according to the size he/she desires and connect the conductive interface 106 to the switchable sheet wherever he/she prefers. Compared to a conventional conductive interface that requires complex/expert manipulation of a switchable sheet that is not possessed by an average consumer, the conductive interface 106 can be connected to the switchable sheet 108 easily by a user. For example, a user can simply insert the conductive interface 106 into the switchable sheet 108 or clip/tape the conductive interface 106 onto the switchable sheet 108. Consequently, compared to conventional conductive interfaces, the conductive interface 106 can ensure the simplicity of establishing an electrical connection to the switchable sheet 108 and the reliability of the electrical connection to the switchable sheet 108.

In an embodiment, the conductive interface 106 includes a power source interface configured to be connected to the power source 102 and a sheet interface electrically connected to the power source interface. The sheet interface is configured to connect to the switchable sheet 108 such that electricity can be conducted from the power source interface to the switchable sheet to switch the switchable sheet between different visibility states. In some embodiments, the sheet interface is made of conductive material, such as metal. In these embodiments, the sheet interface is inserted into the switchable sheet to be in electrical contact with a crystal layer (e.g., the crystal layer 213) of the switchable sheet, either directly or indirectly through another conductive material, such as the conductive layer 212. In some other embodiments, the sheet interface itself is not conductive. However, when the sheet interface is in contact with the switchable sheet, a chemical reaction occurs between the interface element and the switchable sheet and a layer of conductive material is formed as the result of the chemical reaction. The layer of conductive material that is formed as the result of the chemical reaction can be used to conduct electricity to a crystal layer (e.g., the crystal layer 213) of the switchable sheet.

The conductive interface 106 can be embodied in various different forms. For example, the conductive interface 106 may include, without being limited to, a pin-type conductive interface, a clip-type conductive interface, a tape-type conductive interface, and a side-sheet injection conductive interface. FIGS. 3-18 depict some embodiments of the conductive interface 106 depicted in FIG. 1. The conductive interfaces depicted in FIGS. 3-18 are some possible embodiments of the conductive interface 106 depicted in FIG. 1. However, the conductive interface 106 is not limited to those embodiments depicted in FIGS. 3-18. In addition, although the conductive interfaces depicted in FIGS. 3-18 are shown as including certain components, in some embodiments, the conductive interfaces include less or more components to implement less or more functionalities. Further, although some functionalities and features of the conductive interfaces of FIGS. 3-18 are described with respect to the switchable sheet 208 depicted in FIG. 2, the conductive interfaces can be used with various types of switchable sheets, including switchable sheets with different structures and/or operating mechanisms from the switchable sheet 208.

Figure 3:
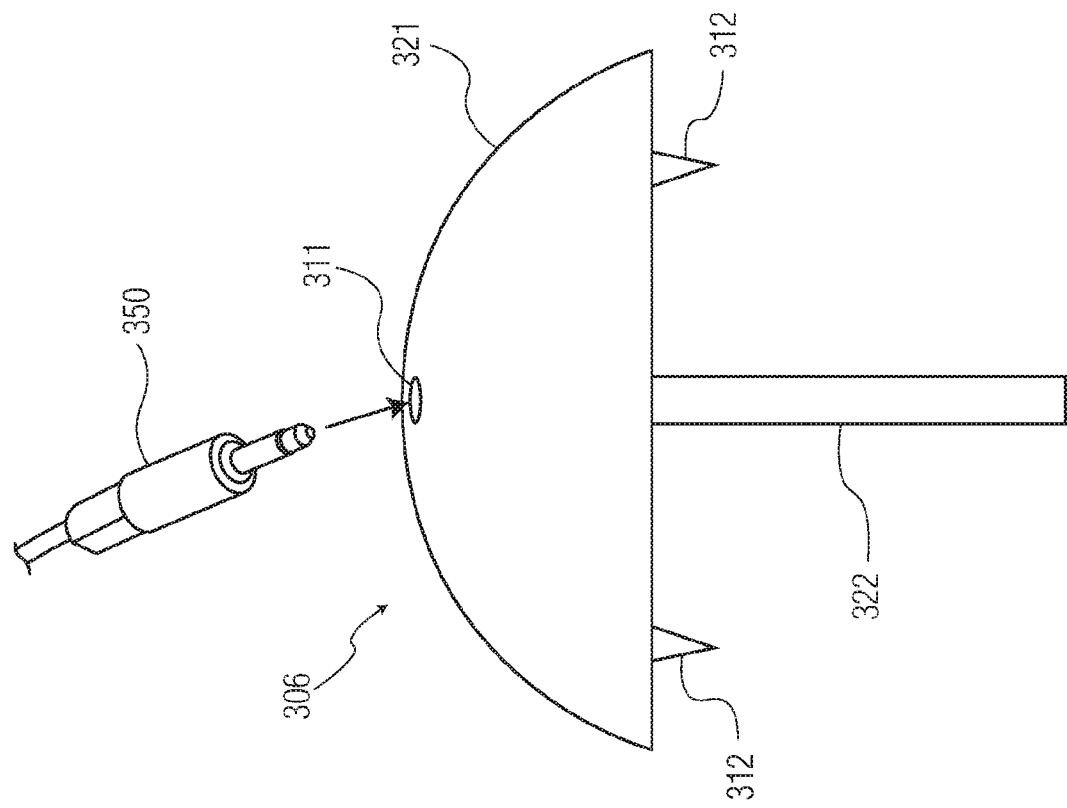
FIG. 3 depicts an embodiment of the conductive interface depicted in FIG. 1 that is implemented as an electrical conducting round bolt.

FIGS. 3-9 depict some embodiments of the conductive interface 106 that are implemented as pin-type conductive interfaces configured to be inserted into the switchable sheet perpendicular to a major surface of the switchable sheet 108. However, pin-type implementations of the conductive interface 106 are not limited to the embodiments depicted in FIGS. 3-9. FIG. 3 depicts an embodiment of the conductive interface 106 that is implemented as an electrical conducting round bolt 306. In the embodiment depicted in FIG. 3, the electrical conducting round bolt 306 includes a bolt head 321 with a cable lead-in scoket/hole 311 and a bolt rod 322. Two identical sharp-pointed pins 312, made of electrical conducting materials, are located on opposite sides at the bottom of the bolt head 321.

The bolt head 321 is configured to activate the switchable sheet 108 or 208 through an electrical cable 350 that is put into the lead-in hole 311 and is in touch with the two pointed pins 312. The electrical cable 350 is connected to a power source. In some embodiments, the cable 350 is connected to the power source 102 via the transformer 104. The sharp-pointed pins 312 are configured to penetrate the switchable sheet 108 or 208 to conduct electricity. In an embodiment, the length of the sharp-pointed pins 312 is longer than the thickness of the layer 211 of the neutral material of the switchable sheet 208, but shorter than the sum of the thickness of the layer 211 of the neutral base material and the thickness of the electrical conducting layer 212 of the switchable sheet 208 to prevent a short circuit. Both sharp-pointed pins can be used to create a physical connection to the electrical conducting layer 212 so that electrical current can be conducted from the sharp-pointed pins to the electrical conducting layer 212. The stability of the switchable sheet can be achieved through the use of the two pointed pins and damage to the liquid crystal layer 213 is reduced through the small punch holes of the sharp-pointed pins. The bolt rod 322 is configured to completely/partially penetrate the switchable sheet 108 or 208 to securely attach the electrical conducting round bolt 306 onto the switchable sheet 108 or 208. The bolt rod 322 may have a sharp end or a flat end as shown in FIG. 3. In the embodiment depicted in FIG. 3, the bolt rod 322 is a round cylindrical rod made of insulating materials. The length of the bolt rod 322 is generally shorter or equal to the overall thickness of the switchable sheet 108 or 208. However, in other embodiments, the bolt rod 322 can be of various shapes and length.

Figure 4:
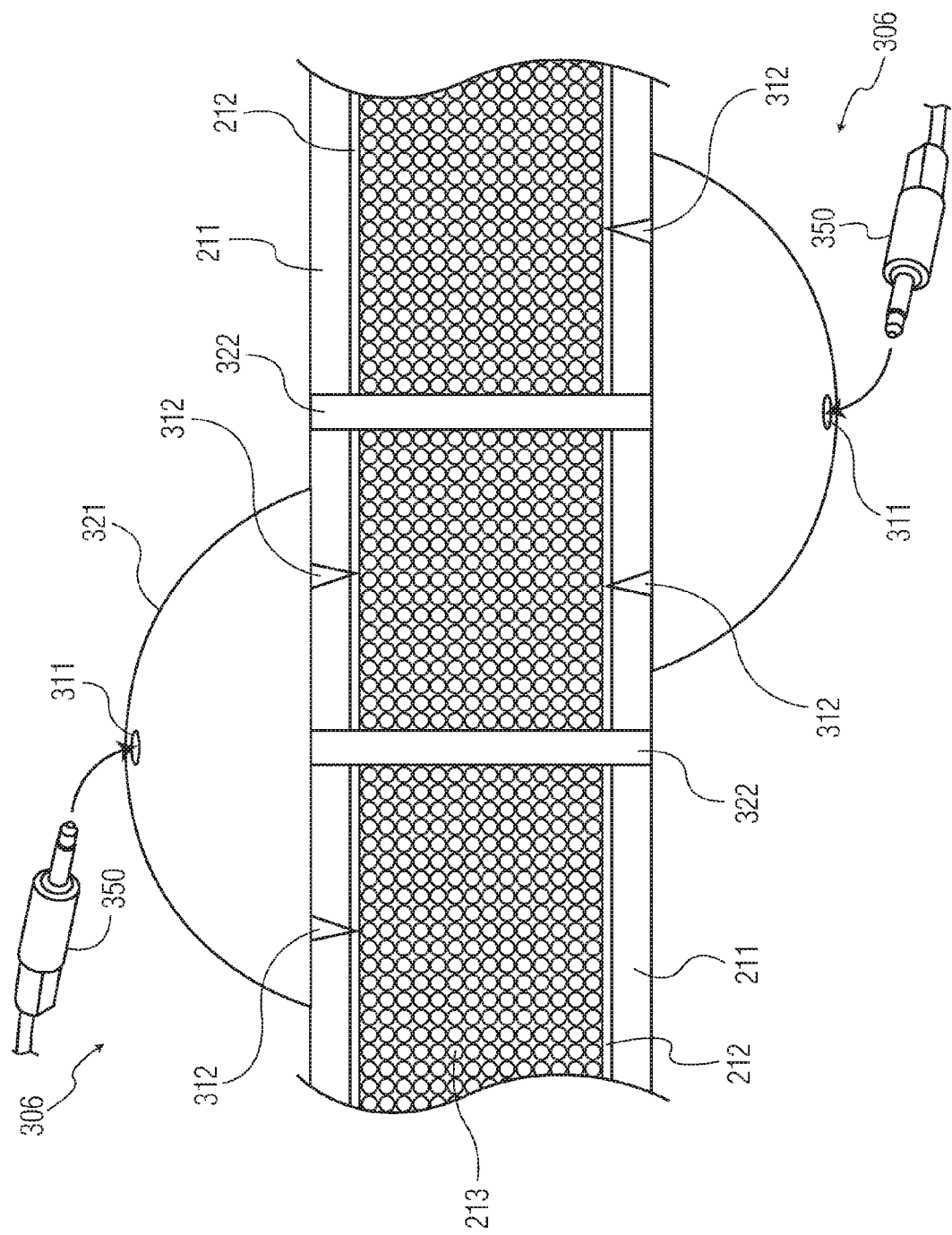
FIG. 4 depicts an example of two electrical conducting round bolts depicted in FIG. 3 that have been connected to a switchable sheet.

FIG. 4 depicts an example of two electrical conducting round bolts 306 that have been connected to the switchable sheet 208. When a user wants to install the switchable sheet 208, he/she cuts the sheet to the appropriate size and punches two holes to the switchable sheet 208 where electrical cables 350 are to be connected. The two holes are big enough for the bolt rods 322 to go through. Once a bolt rod 322 has been pushed into the switchable sheet 208 through a hole, the bolt head 321 can be pressed slightly so as to push the two pointed pins 312 into the electrical conducting layer 212 to conduct electricity. As shown in FIG. 4, the length of the sharp-pointed pins 312 is longer than the thickness of the layer 211 of the neutral material, but shorter than the sum of the thickness of the layer 211 of the neutral base material and the thickness of the electrical conducting layer 212. The length of the bolt rod 322 is equal to the thickness of the switchable sheet 208. Electrical cables 350 are connected to the two pointed pins through the lead-in hole 311. The electrical cables 350 are connected to a power source. In some embodiments, the cables 350 are connected to the power source 102 via the transformer 104. If the user wants to change the installation location of the switchable sheet 208, the round bolts 306 can be removed from the switchable sheet 208 while the switchable sheet 208 is installed at a new position. If the user wants to reduce the size of the switchable sheet 208 or to separate the switchable sheet 208 into several smaller sheets, the user can cut the switchable sheet 208 using a pair of scissors and reinstall the switchable sheet 208 using the bolts 306 as he/she wishes.

Figure 5:
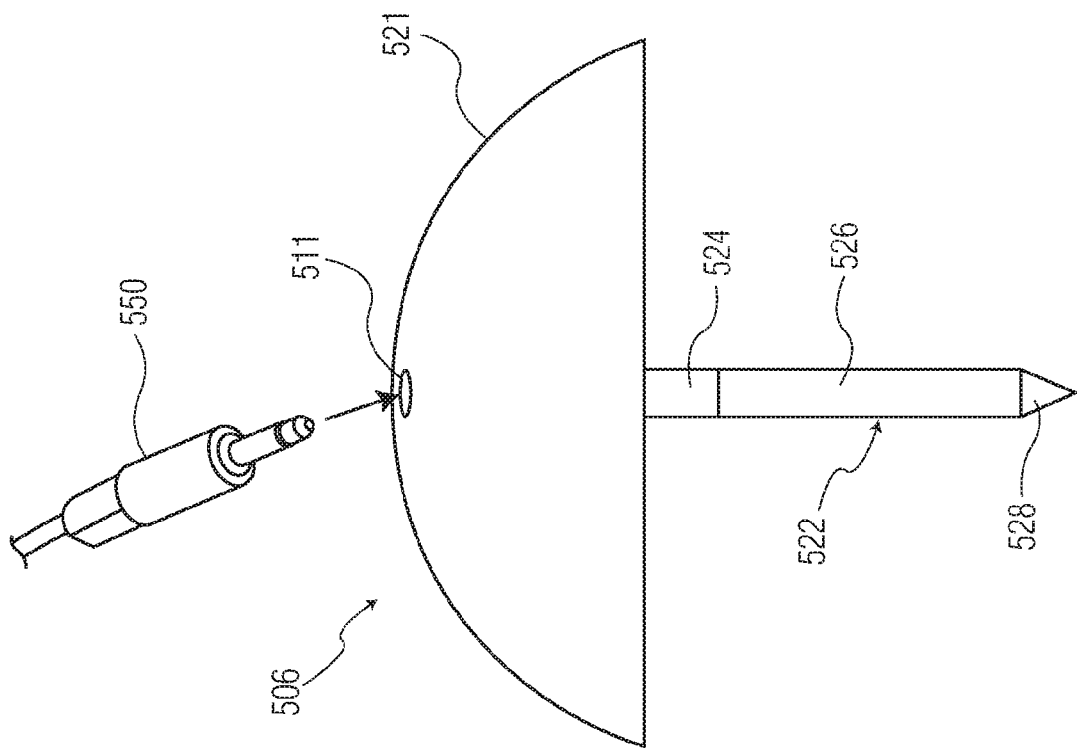
FIG. 5 depicts another embodiment of the conductive interface depicted in FIG. 1 that is implemented as an electrical conducting round bolt.

FIG. 5 depicts another embodiment of the conductive interface 106 that is implemented as an electrical conducting round bolt 506. In the embodiment depicted in FIG. 5, the electrical conducting round bolt 506 includes a bolt head 521 and a bolt pin 522. The bolt head 521 has a lead-in socket/hole 511 through which an electrical cable 550 can be connected to activate the switchable sheet 108 or 208. The electrical cable 550 is connected to a power source. In some embodiments, the cable 550 is connected to the power source 102 via the transformer 104. The bolt head 521 is configured to activate the switchable sheet 108 or 208 through the electrical cable 550 that is put into the lead-in hole 511. The bolt pin 522 is configured to penetrate the switchable sheet 108 or 208 to securely attach the round bolt 506 onto the switchable sheet 108 or 208 and to conduct electricity. A major difference between the round bolt 506 of FIG. 5 and the round bolt 306 of FIG. 3 is that instead of sharp-pointed pins 312, the bolt pin 522 of FIG. 5 is used to conduct electricity through the switchable sheet 108 or 208. In the embodiment depicted in FIG. 5, the bolt pin 522 includes, from the top to the bottom in the direction from the bolt head 521, an electrical conducting section 524, an insulating section 526 and a sharp pointed end 528. In an embodiment, the length of the electrical conducting section 524 is longer than the thickness of the base material layer 211 of the switchable sheet 208, but shorter than the sum of the thickness of the base material layer 211 and the thickness of the electrical terminal layer 212 of the switchable sheet 208 so that the electrical conducting section 524 can be in conduct with the electrical terminal layer 212. The insulating section 526 is made of insulating material. In an embodiment, the length of the insulating section 526 is shorter or equal to the thickness of the liquid crystal layer 213 of the switchable sheet 208. The sharp pointed end 528 is used to penetrate the switchable sheet 108 or 208.

Figure 6:
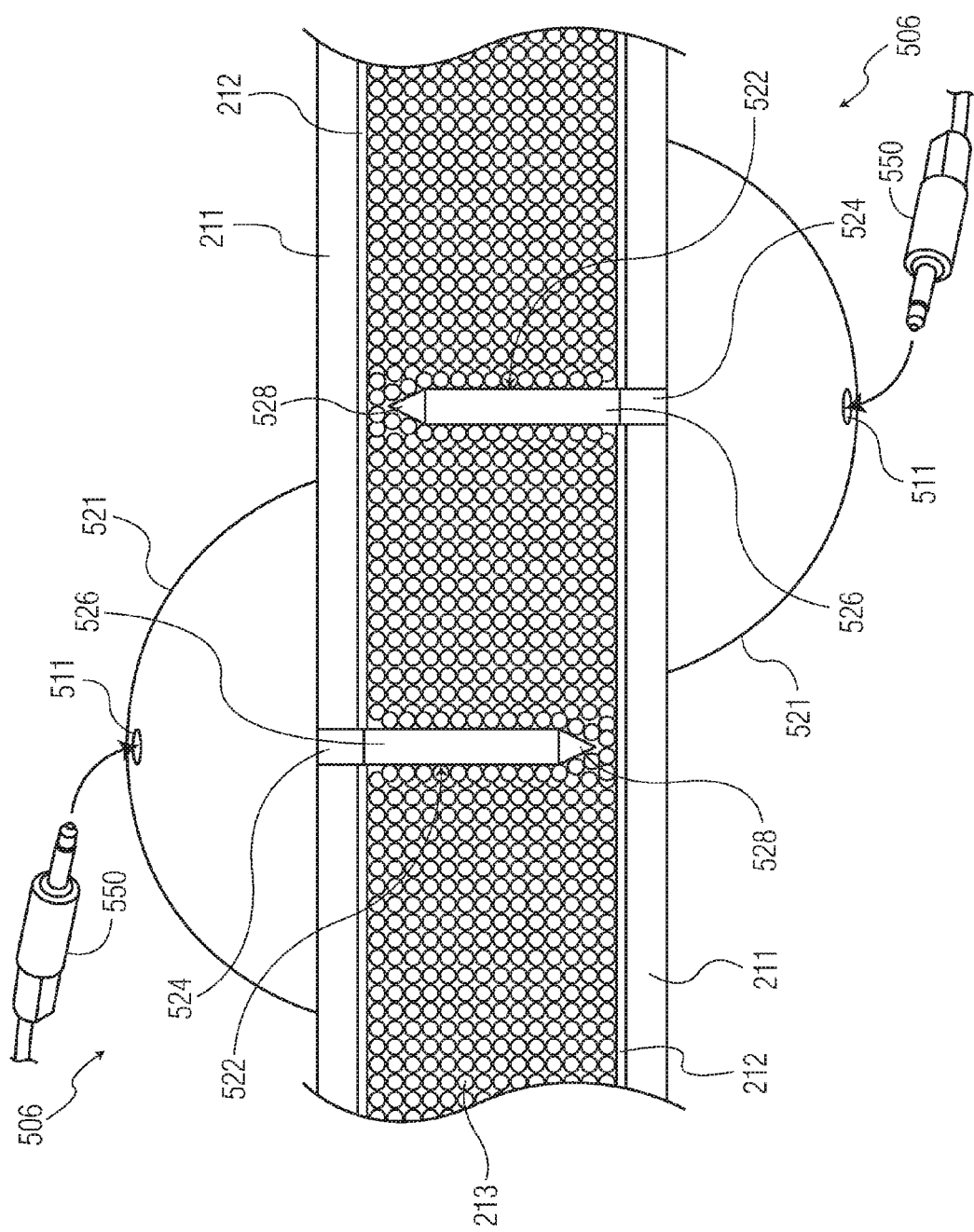
FIG. 6 depicts an example of two electrical conducting round bolts depicted in FIG. 5 that have been connected to a switchable sheet.

FIG. 6 depicts an example of two electrical conducting round bolts 506 that have been connected to the switchable sheet 208. Before installation, a user can cut the switchable sheet 208 to the size as he/she desires. The user then inserts the two round bolts 506 into the switchable sheet 208 by means of the sharp point 528 of each of the bolts 506. Two electrical cables 550 are connected to the bolts 506 through the lead-in hole 511 of each of the bolts. The electrical cables 550 are connected to a power source. In some embodiments, the cables 550 are connected to the power source 102 via the transformer 104. If the user wants to change the installation location of the switchable sheet 208, the round bolts 506 can be removed from the switchable sheet 208 while the switchable sheet 208 is installed at a new position. If the user wants to reduce the size of the switchable sheet 208 or to separate the switchable sheet 208 into several smaller sheets, the user can cut the switchable sheet 208 using a pair of scissors and reinstall the switchable sheet 208 using the bolts 506 as he/she wishes.

Figure 7:
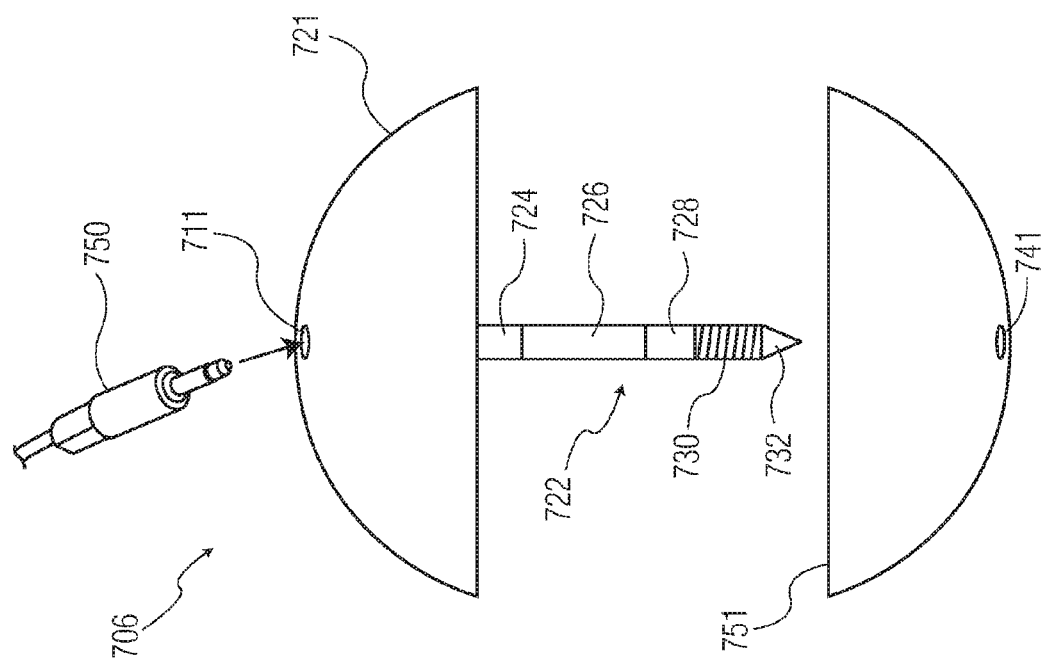
FIG. 7 depicts another embodiment of the conductive interface depicted in FIG. 1 that is implemented as an electrical conducting round bolt.

FIG. 7 depicts another embodiment of the conductive interface 106 that is implemented as an electrical conducting round bolt 706. In the embodiment depicted in FIG. 7, the round bolt 706 includes a bolt head 721 and a bolt pin 722.

The bolt head 721 has a lead-in socket/hole 711 through which an electrical cable 750 can be connected to activate the switchable sheet 108 or 208. The electrical cable 750 is connected to a power source. In some embodiments, the cable 750 is connected to the power source 102 via the transformer 104. The bolt head 721 is configured to activate the switchable sheet 108 or 208 through the electrical cable 750 that is put into the lead-in hole 711. The bolt pin 722 is configured to penetrate the switchable sheet 108 or 208 to securely attach the round bolt 706 to the switchable sheet 108 or 208 and to conduct electricity. In the embodiment depicted in FIG. 7, the bolt pin 722 includes, from the top to the bottom, a first electrical conducting section 724, an insulating section 726, a second electrical conducting section 728, a threaded section 730, and a sharp pointed end 732. In an embodiment, the length of the electrical conducting section 724 is longer than the thickness of the base material layer 211 of the switchable sheet 208 but shorter than the sum of the thickness of the base material layer 211 and the thickness of the electrical terminal layer 212 of the switchable sheet 208 so as to contact the electrical terminal layer 212 to conduct electricity. The insulating section 726 is made of insulating materials. In an embodiment, the length of the insulating section 726 is the same as the thickness of the adhesive liquid crystal layer 213 of the switchable sheet 208. The electrical conducting round bolt 706 is used with a matching bolt head or threaded nut 751 with a lead-in hole 741 through which an electrical cable 750 can be connected to activate the switchable sheet.

Figure 8:
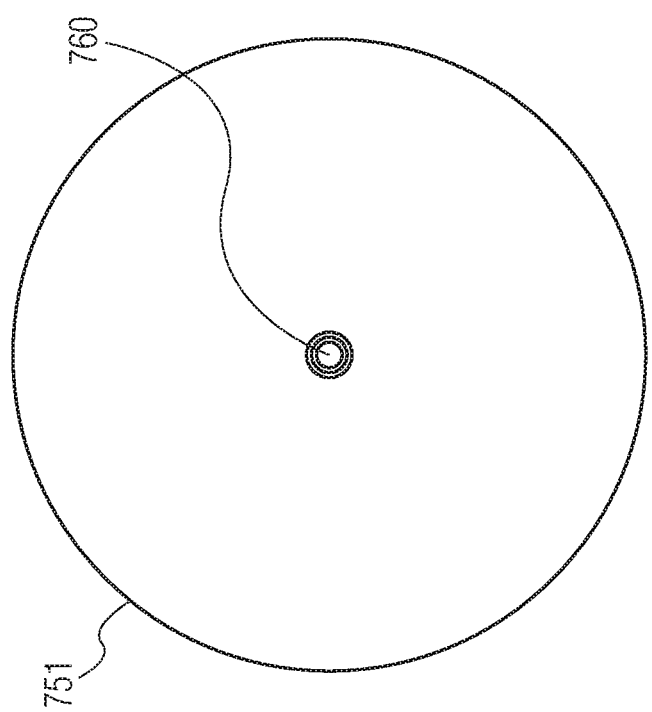
FIG. 8 depicts a diagram of a bolt head for the electrical conducting round bolt depicted in FIG. 7.

FIG. 8 depicts a diagram of the bolt head 751. In the embodiment depicted in FIG. 8, the bolt head 751 has a threaded section 760. To activate the switchable sheet, electricity is paned to the electrical conducting layers 212 of the switchable sheet 208 through electrical cables 750 that are connected to the lead-in holes 711, 741.

Figure 9:
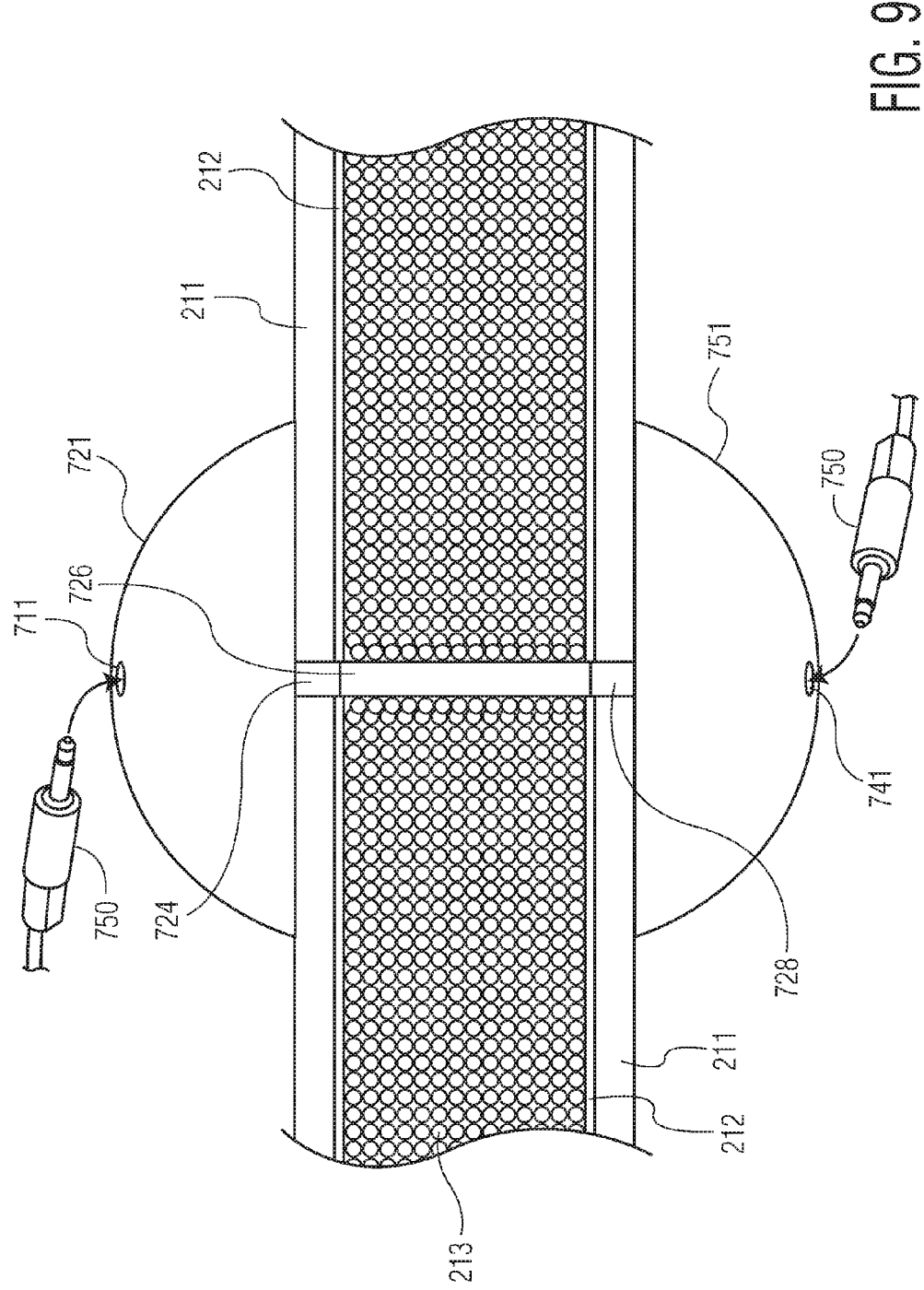
FIG. 9 depicts an example of the round bolt and the bolt head depicted in FIG. 7 that have been connected to a switchable sheet.

FIG. 9 depicts an example of the round bolt 706 and the matching bolt head or threaded nut 751 that have been connected to the switchable sheet 208. Before installation, a user cuts the switchable sheet 208 to the required size. The sharp pointed end 732 of the bolt pin 722 is then inserted into the switchable sheet 208. The thread 730 on the pin 722 is screwed into the threaded hole 706 of the threaded nut 751 so as to fasten the bolt 706 to the switchable sheet 208. Two electrical cables 750 are used to connect the lead-in holes 711, 741 of the bolt 706 for supply of electricity. The electrical cables 750 are connected to a power source. In some embodiments, the cables 750 are connected to the power source 102 via the transformer 104. If the user wants to change the installation position of the switchable sheet 208, the screw bolt 706 and the bolt head 751 can be removed while the switchable sheet 208 is installed at a new position. If the user wants to reduce the size of the switchable sheet 208 or to separate the switchable sheet 208 into several smaller sheets, he/she can simply do that with a pair of scissors and reinstall the switchable sheet 208 using the bolt 706 as he/she wishes.

Figure 10:
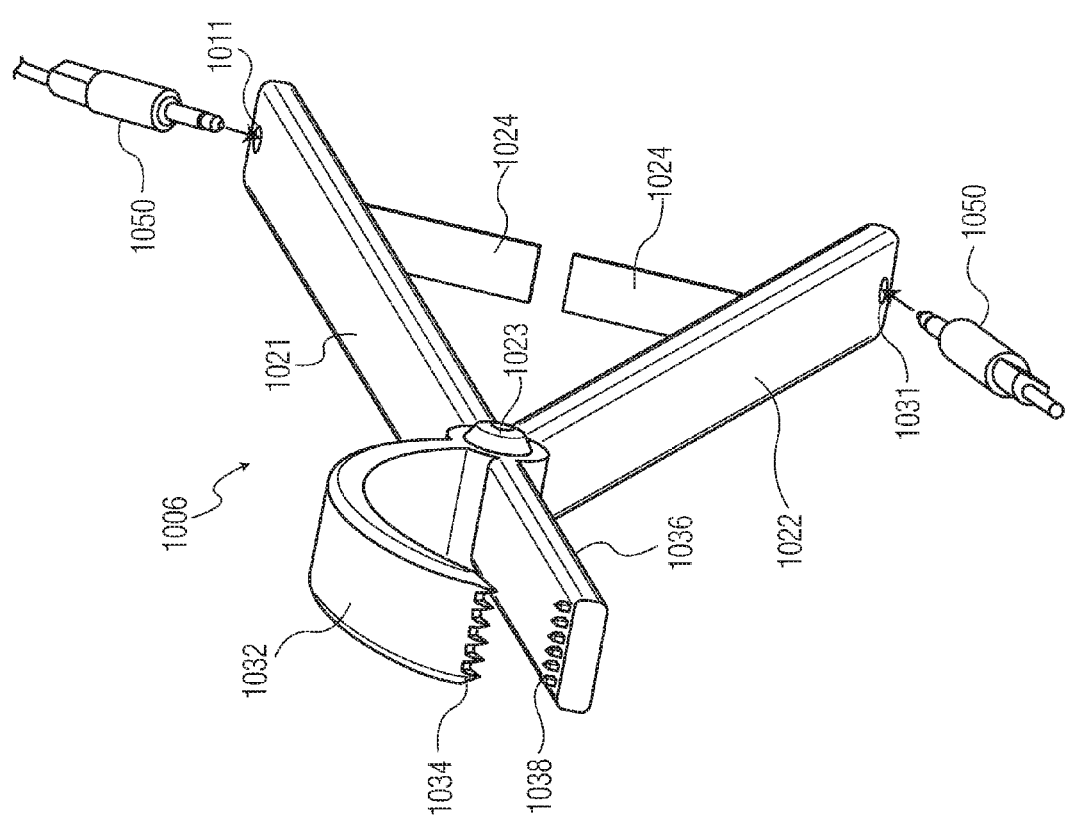
FIG. 10 depicts an embodiment of the conductive interface depicted in FIG. 1 that is implemented as a clip-type conductive interface.

The conductive interface 106 can also be implemented as a clip-type conductive interface. FIG. 10 depicts an embodiment of the conductive interface 106 that is implemented as a clip-type conductive interface. However, clip-type implementations of the conductive interface 106 are not limited to the embodiment depicted in FIG. 10. In the embodiment depicted in FIG. 10, an electrical conducting clip 1006 includes an arc-shaped arm 1022 and a straight arm 1021, fixed together by an axial joint 1023. Each arm 1021 or 1022 has a lead-in socket/hole 1011 or 1031 through which an electrical cable 1050 can be connected to activate the switchable sheet 108 or 208. The electrical cable 1050 is connected to a power source. In some embodiments, the cable 1050 is connected to the power source 102 via the transformer 104. In addition, the electrical conducting clip 1006 includes two handles 1024, one handle on each arm. When the electrical conducting clip is closed by the location handles, the gap between the two sharp-teethed edges of the two arms 1021, 1022 is bigger than the thickness of the crystal layer 213 of the switchable sheet 208 but smaller than the sum of the thickness of the liquid crystal layer 213 and that of the electrical conducting layer 212 of the switchable sheet 208. In an embodiment, the axial joint 1023 is at a position which is ⅖ to ⅗ the length of each of the arms 1021, 1022. The axial joint 1023 fixes together the arc-shaped arm 1022 and the straight arm 1021 and divides the arms 1021, 1022 into short and long portions. The arc-shaped arm 1022 includes an arc-shaped head 1032 with a teeth-shaped edge 1034. The straight arm 1021 includes a head 1036 with a sharp-teethed edge 1038. In an embodiment, the position of the two handles 1024 is at a point about ⅕ to ⅖ of the length of each arm 1021 or 1022. The short portions of the arc-shaped arm 1022 and the straight arm 1021 may be magnetized to possess magnetic properties. The electrical conducting clip 1006 is made of an electrical conducting material. The switchable sheet 108 or 208 can be activated by panning electricity to electrical cables 1050 which are connected to lead-in holes 1011, 1031 of the clip 1006.

Figure 11:
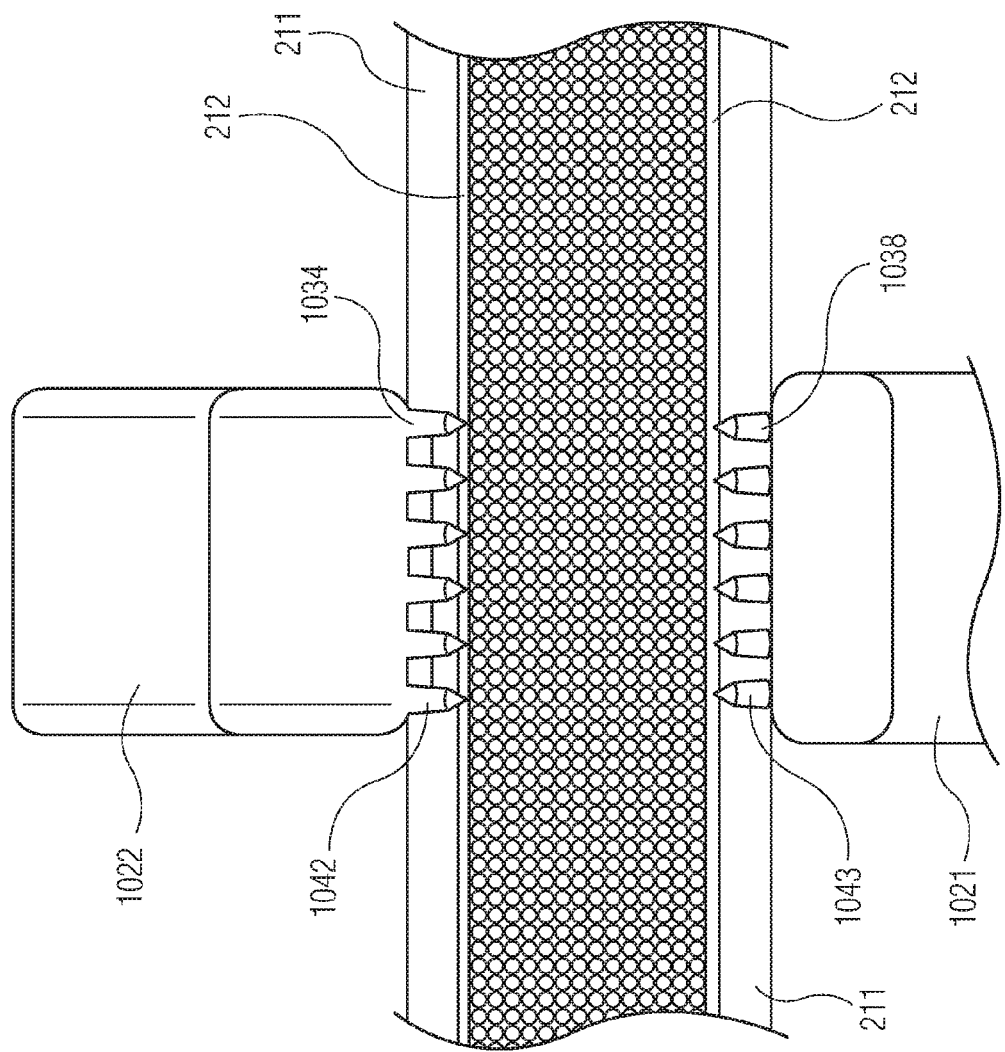
FIG. 11 depicts a diagram of a teeth-shaped edge of an arc-shaped arm and a sharp-teethed edge of a straight arm of the clip depicted in FIG. 10.

FIG. 11 depicts a diagram of the teeth-shaped edge 1034 of the arc-shaped arm 1022 of the clip 1006 and the sharp-teethed edge 1038 of the straight arm 1021 of the clip 1006. In the embodiment depicted in FIG. 11, the teeth-shaped edge 1034 includes teeth 1042. In an embodiment, the length of the teeth 1042 is longer than the thickness of the insulating base layer 211 of the switchable sheet 208 but shorter than the sum of the thickness of the insulating base 211 and the thickness of the electrical conduct layer 212 of the switchable sheet 208. The sharp-teethed edge 1038 includes teeth 1043. In an embodiment, the length of the teeth 1043 is longer than the thickness of the insulating base layer 211 of the switchable sheet 208 but shorter than the sum of the thickness of the insulating base 211 and the thickness of the electrical conduct layer 212 of the switchable sheet 208.

An example of the electrical conducting clip 1006 that has been connected to the switchable sheet 208 is described as follows. The installation example includes a sheet cutting step, a sheet mounting step, a clip installation step, a cable connection, and a testing step. In the cutting step, a user cuts the switchable sheet 208 to the size according to his/her requirement. The user then seals the cut openings by spreading a layer of insulating moisture-proof substance to prevent water from entering into the liquid crystal layer 213 to damage the switchable sheet 208. In the sheet mounting step, after cutting the sheet 208, transparent glue is applied to the side of the sheet 208 for mounting the sheet 208 to a window pane or other surface area. In the clip installation step, the user opens the clip 1006 by widening the ends of the two arms 1021, 1022. The head 1032 of the arc-shaped arm 1022 is placed at the front of the switchable sheet 208 and the head 1036 of the straight arm 1021 is placed at the gap between the back of the switchable sheet 208 and the window pane or other surface (e.g., a wall). The two sharp-teethed edges 1034, 1038 on the heads 1032, 1036 of the two arms 1022, 1021 grips softly the two sides of edges of the switchable sheet 208, cutting through the insulating base layer 211 of the switchable sheet 208 and getting in touch with the electrical conducting layer 212 of the switchable sheet 208 without cutting into the liquid crystal layer 213 of the switchable sheet 208. In the cable connection step, two electrical cables 1050 are connected to the two lead-in holes 1011, 1031 at the ends of the two arms 1021, 1022. The electrical cables 1050 are connected to a power source. In some embodiments, the cables 1050 are connected to the power source 102 via the transformer 104. In the testing step, when electrical power is switched on and off, the installation is completed if the switchable sheet 208 is changed from dim to bright and from bright to dim. If the user wants to change the installation position of the switchable sheet 208, the clip 1006 can be removed from the switchable sheet 208 while the switchable sheet 208 is installed at a new position. If the user wants to reduce the size of the switchable sheet 208 or to separate the switchable sheet 208 into several smaller sheets, he/she can simply do that with a pair of scissors and reinstall the switchable sheet 208 using the clip 1006 as he/she wishes.

Figure 12:
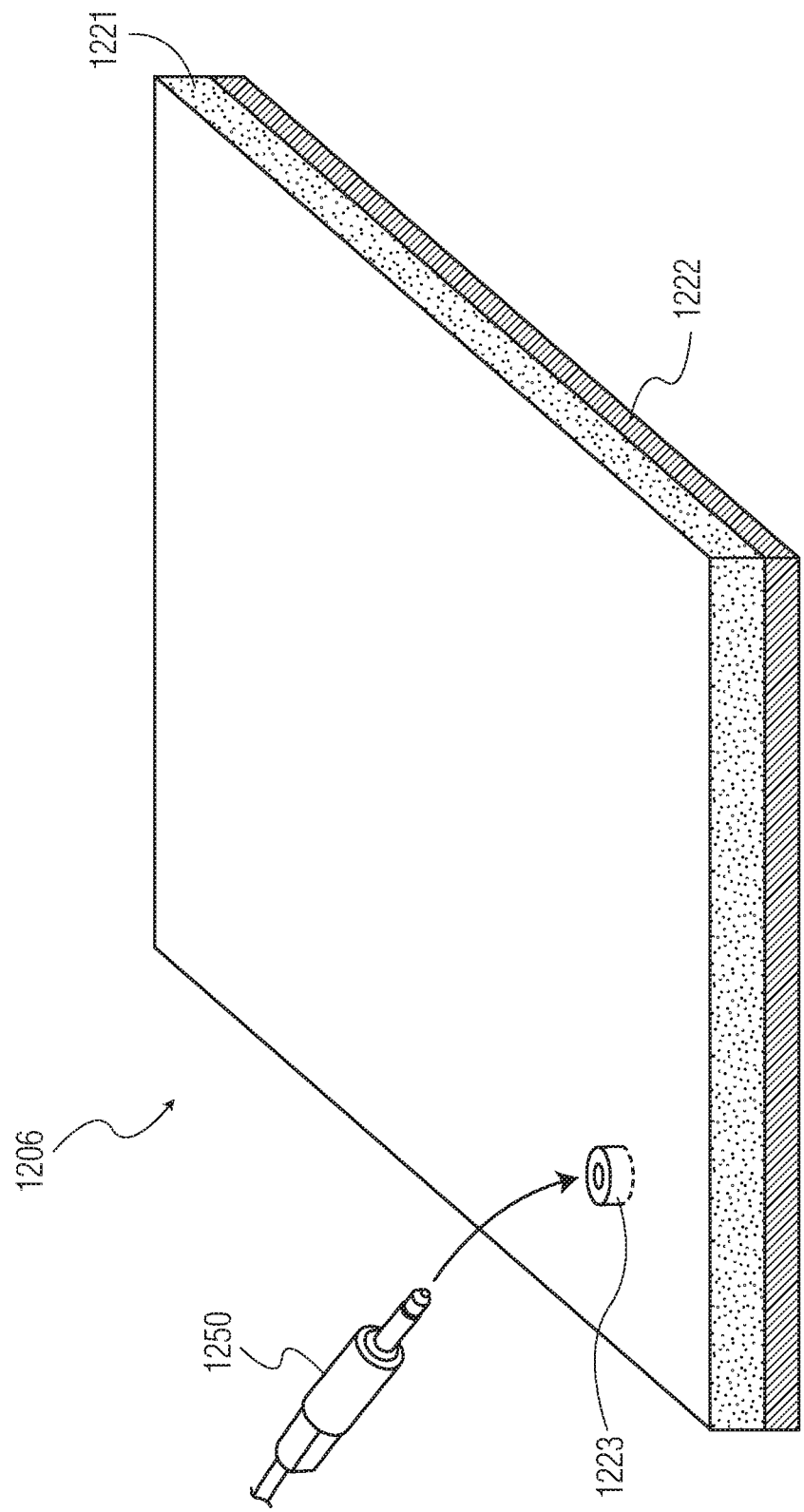
FIG. 12 depicts an embodiment of the conductive interface 106 depicted in FIG. 1 that is implemented as a tape-type conductive interface.

The conductive interface 106 can also be implemented by a tape-type conductive interface configured to attach and/or adhere to a major surface of the switchable sheet 108. FIG. 12 depicts an embodiment of the conductive interface 106 that is implemented as a tape-type conductive interface 1206. However, tape-type implementations of the conductive interface 106 are not limited to the embodiment depicted in FIG. 12. In the embodiment depicted in FIG. 12, the electrical conducting tape interface 1206 includes a hard sheet carrier layer 1221 with a connecting socket/hole 1223 on the edge, from which one or more power cables 1250 can go through, and a chemical material layer 1222 on one side of the hard sheet layer 1221. The electrical cable 1250 is connected to a power source. In some embodiments, the cable 1250 is connected to the power source 102 via the transformer 104. The hard sheet layer 1221 can be made of metal, alloy, rigid plastic, bakelite, Printed Circuit Board (PCB) plate. In some embodiments, the user can coat one side of the tape interface 1206 with a layer of chemical material to form the chemical layer 1222. The chemical material layer 1222 can be used to attach/fix the tape interface 1206 and the switchable sheet 108 or 208 together through a chemical reaction. In some embodiments, the chemical material layer 1222 can form a conducting material through a chemical reaction with the insulating base layer 211 of the switchable sheet 208. In these embodiments, the formed conducting material is in contact with the conducting layer 212 of the switchable sheet 208. In an embodiment, the thickness of the chemical material layer 1222 is the same as the thickness of the liquid crystal layer 213 of the switchable sheet 208. To activate the switchable sheet 208, the power cable 1250 is connected with the conducting layer 212 of the switchable sheet 208 through the connecting hole 1223.

Figure 13:
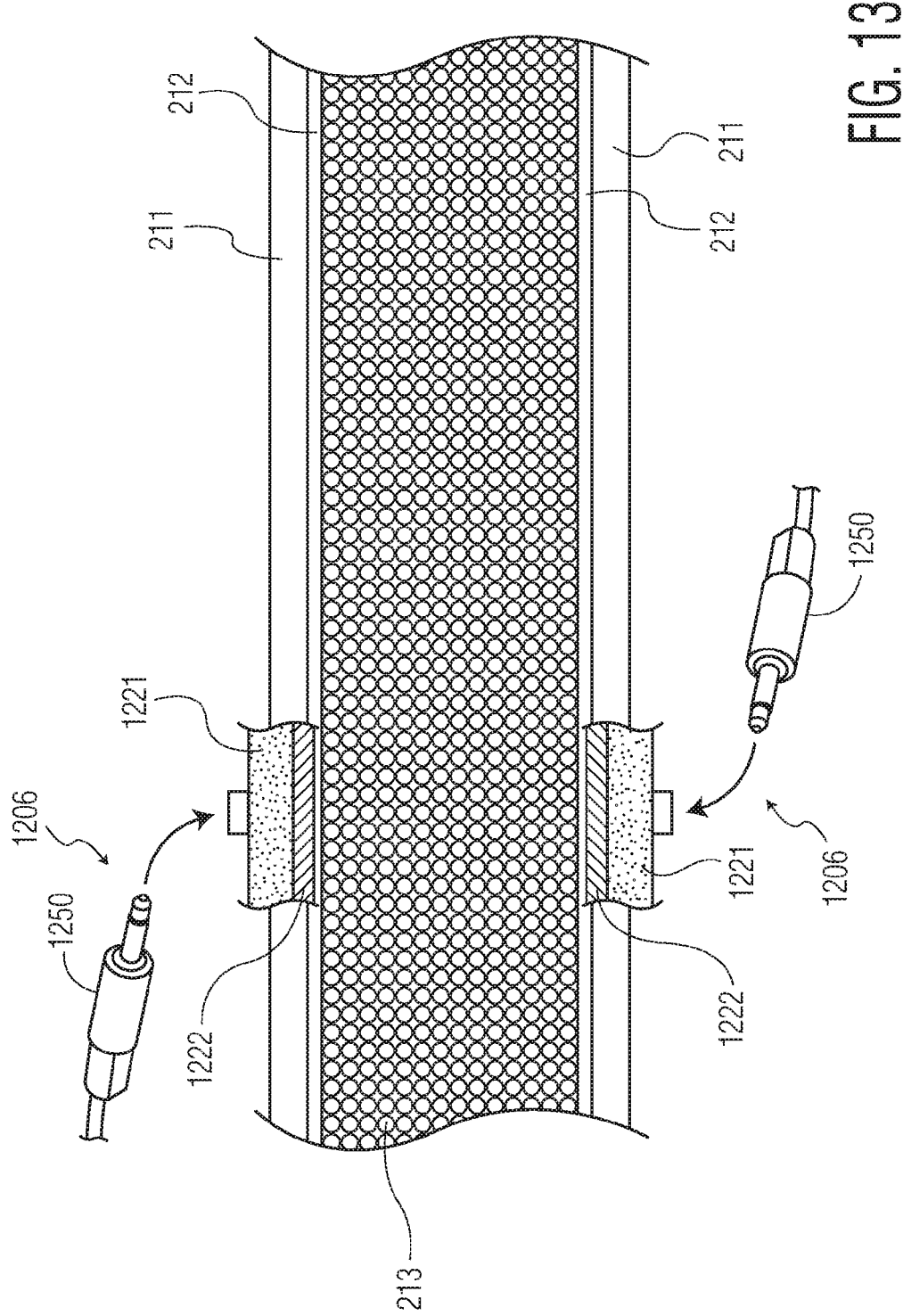
FIG. 13 depicts an example of two tape interfaces depicted in FIG. 12 that have been connected to a switchable sheet.
Figure 14:
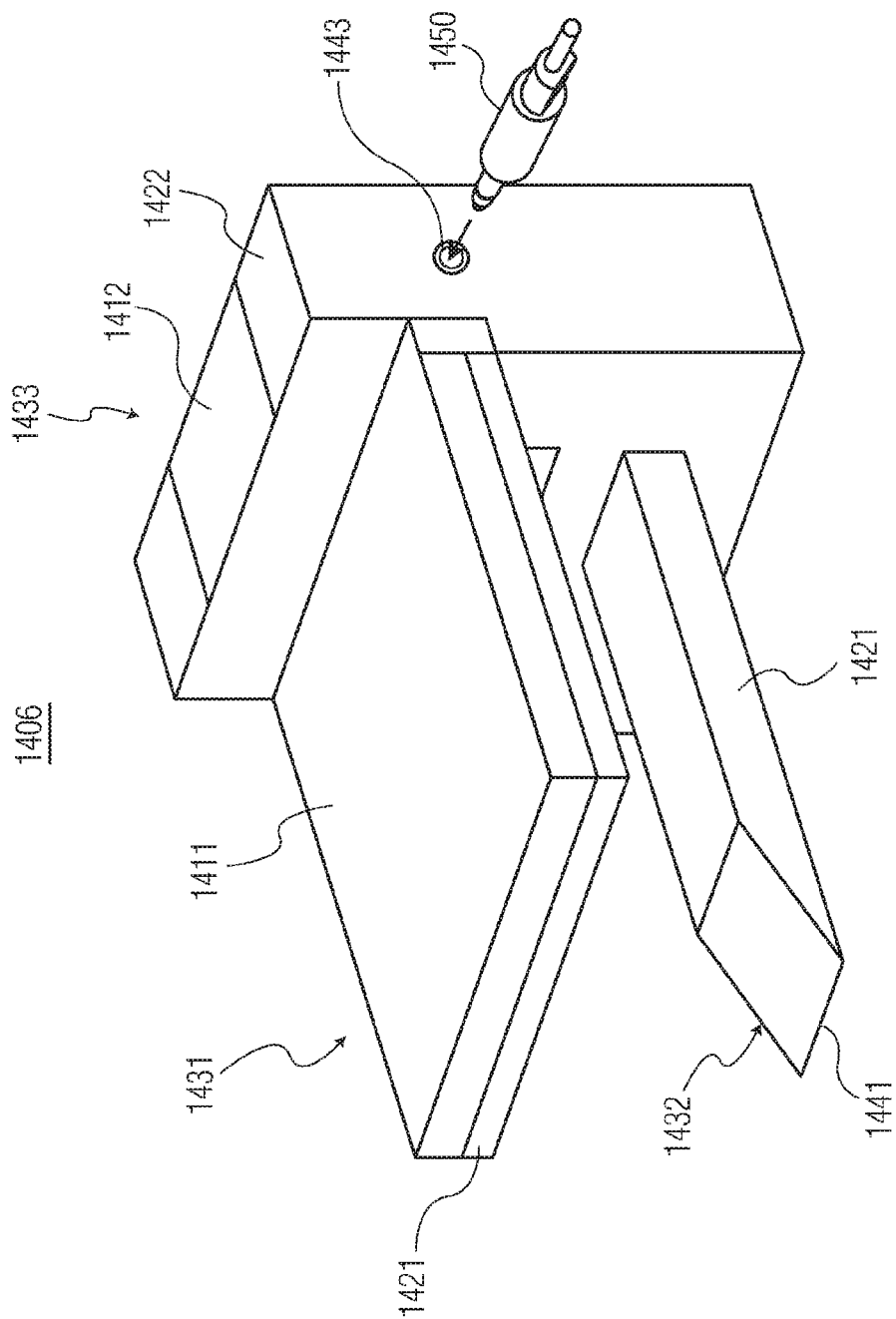
FIG. 14 depicts an embodiment of the conductive interface depicted in FIG. 1 that is implemented as a side injection type conductive interface.

FIG. 13 depicts an example of two tape interfaces 1206 that have been connected to the switchable sheet 208. A user can install the switchable sheet 208 by putting the chemical layer 1222 of the tape interface 1206 on the insulating base (e.g., plastic) layer 211 of the switchable sheet 208, which causes a chemical reaction between the chemical layer 1222 of the tape interface 1206 and the base layer 211 of the switchable sheet 208 to form a layer of conducting material. The conducting material layer is in contact with the conducting layer 212 of the switchable sheet 208. Two electrical cables 1250 can be connected to sockets 1223 of tape interfaces 1206 for switching the switchable sheet 208. The electrical cables 1250 are connected to a power source. In some embodiments, the cables 1250 are connected to the power source 102 via the transformer 104.

The conductive interface 106 can also be implemented by a side injection type conductive interface configured be inserted into a side surface of the switchable sheet 108. In some embodiments, the conductive interface 106 is implemented by a side injection type conductive interface that is to be inserted into the switchable sheet 108 in parallel with a major surface of the switchable sheet 108. FIGS. 14-18 depict two embodiments of the conductive interface 106 that is implemented as a side injection type conductive interface 1406 or 1506. However, side injection type implementations of the conductive interface 106 are not limited to the embodiments depicted in FIGS. 14-18. In the embodiment depicted in FIG. 14, the side injection device includes a fixed plate 1431, a sharp-edged block 1432 and a fixture block 1433 with a plug/socket 1443 through which an electrical cable 1450 can be connected to activate the switchable sheet 108 or 208. The electrical cable 1450 is connected to a power source. In some embodiments, the cable 1450 is connected to the power source 102 via the transformer 104. The plug 1443 may be a screw-type plug with a bolt head and a bolt pin, or a spindle-type plug which is big in the middle and small in the both ends. The fixed plate 1431 includes a quadrate plate 1411 and a double-sided adhesive tape 1421. The sharp-edged block 1432 includes an inserting plate 1421 and a blade 1441. The fixture block 1433 includes a quadrate block 1412 and a base block 1422. The sharp-edged block 1432 extends from the lower side of the fixture block 1433. The sharp-edged block 1432 is used to fasten the switchable sheet 108 or 208, for example, punching on the electrical conducting layer 212 of the switchable sheet 208. In some embodiment, the inserting plate 1421 of the sharp-edged block 1432 is inserted between the electrical conducting layer 212 of the switchable sheet and the polymer/liquid crystal layer 213 of the switchable sheet 208. After the side-way insertion of the inserting plate 1421 into the switchable sheet, the sharp-edged block 1432 contacts the electrical conducting layer 212 of the switchable sheet 208 and electricity can be conducted through the switchable sheet 208 via the electrical cable 1450. In some embodiments, the thickness of the inserting plate 1421 is bigger than or equal to the thickness of the polymer/liquid crystal layer 213 of the switchable sheet 208, with an insulating layer 211 of the switchable sheet 208 on its lower side and an electrical conducting layer 212 of the switchable sheet 208 on the upper side. The side injection device 1406 sticks to the switchable sheet 108, 208 by the double-sided adhesive tape 1421 that is on the lower side of the fixed plate 1431.

Figure 15:
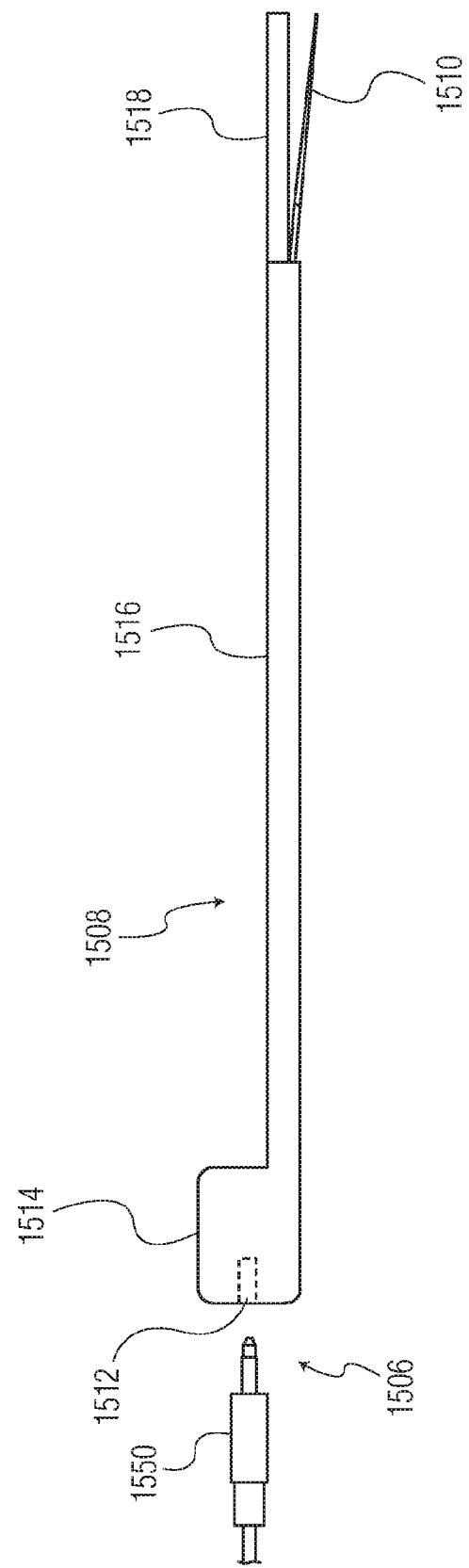
FIG. 15 depicts another embodiment of the conductive interface depicted in FIG. 1 that is implemented as a side injection type conductive interface.

FIG. 15 depicts another embodiment of the conductive interface 106 that is implemented as a side injection type conductive interface 1506. In the embodiment depicted in FIG. 15, the side injection device 1506 includes a body 1508, a conductive blade 1510, and a socket 1512 from which one or more power cables 1550 can go through. The electrical cable 1550 is connected to a power source. In some embodiments, the cable 1550 is connected to the power source 102 via the transformer 104. The body 1508 may be made of electrical insulation rubber. The conductive blade 1510 can be implemented as a thin metallic piece insulated between positive and negative terminals mounted on flexible tape wiring, and a socket 1512 from which one or more power cables 1550 can go through. In some embodiments, the conductive blade is inserted into the crystal layer 213 of the switchable sheet 208. In some embodiments, the conductive blade is inserted into the electrical terminal layer 212 of the switchable sheet 208. The socket 1512 may be a 2.5 mm socket that provides an inlet for one or more power cables 1550. The rubber body 1508 includes a head section 1514 that hosts the socket 1512, a long neck section 1516 that contains wires and terminals connecting the conductive blade 1510 and the socket 1512, and a plate section 1518 that is used to secure the switchable sheet 108 or 208 onto the side injection device 1506. Although the side injection device 1506 is shown as including certain components, in some embodiments, the side injection device 1506 includes less or more components to implement less or more functionalities.

Figure 16:
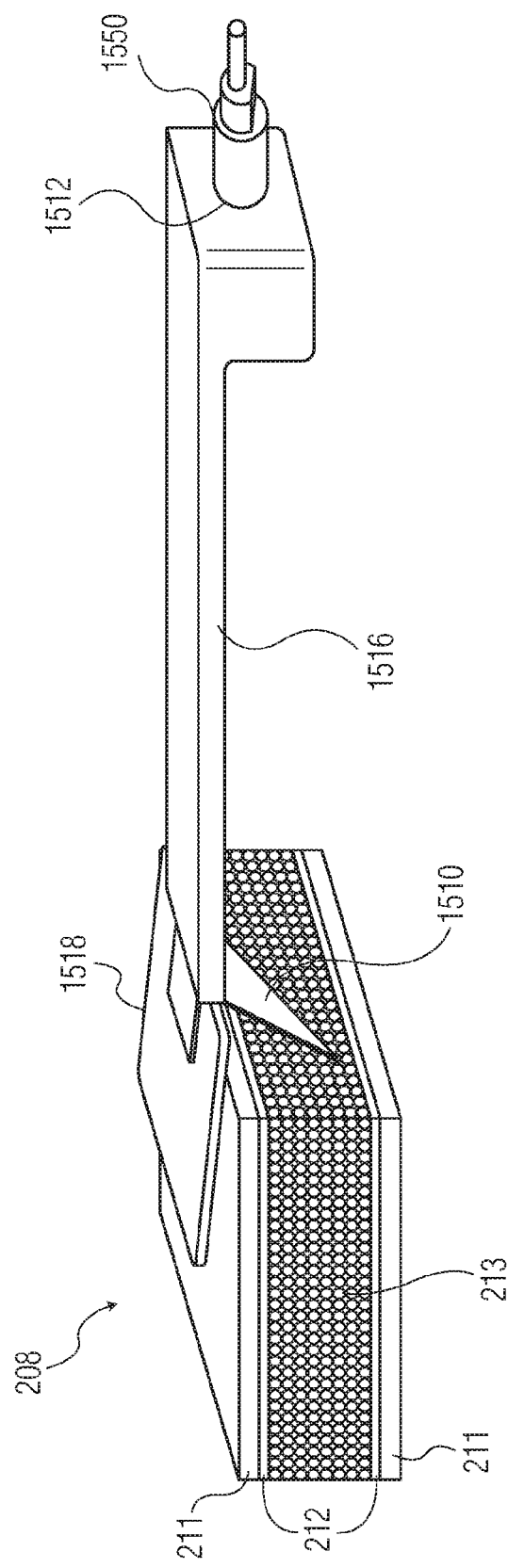
FIG. 16 depicts an example of the side injection device depicted in FIG. 15 that has been connected to a switchable sheet.

FIG. 16 depicts an example of the side injection device 1506 that has been connected to the switchable sheet 208. Before installation, a user cuts the switchable sheet 208 to the required size. He/she places the plate 1518 of the body 1508 of the side injection device 1506 on the switchable sheet 208 and then inserts the conductive blade 1510 of the side injection device 1506 into the crystal layer 213 of the switchable sheet 208. In some embodiments, the conductive blade 1510 is inserted into the electrical conductive layer 212 of the switchable sheet 208. After the side injection device 1506 is securely attached to the switchable sheet 208, the user can connect a power cable 1550 into the socket 1512 to control the switchable sheet 208. The electrical cable 1550 is connected to a power source. In some embodiments, the cable 1550 is connected to the power source 102 via the transformer 104.

Figure 17:
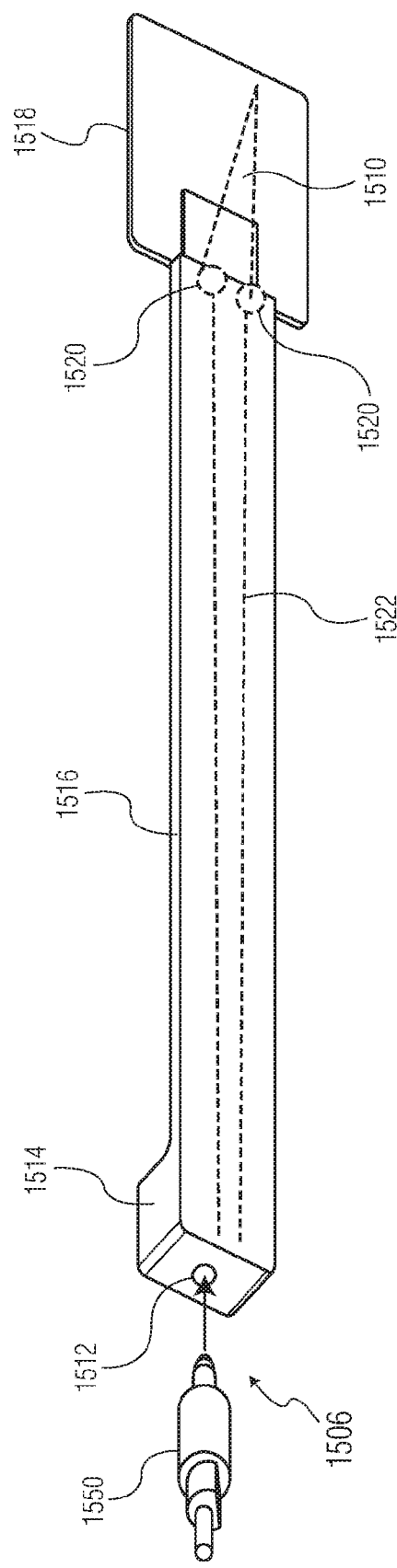
FIG. 17 depicts a perspective view of the side injection device depicted in FIG. 15.

FIG. 17 depicts a perspective view of the side injection device 1506. As shown in FIG. 17, cable wires 1522 are connected between positive and negative terminals 1520, which are connected to the conductive blade 1510. The wires 1522 and the terminals 1520 are located inside the neck 1516 and the head 1512 of the body 1508 of the side injection device 1506.

Figure 18:
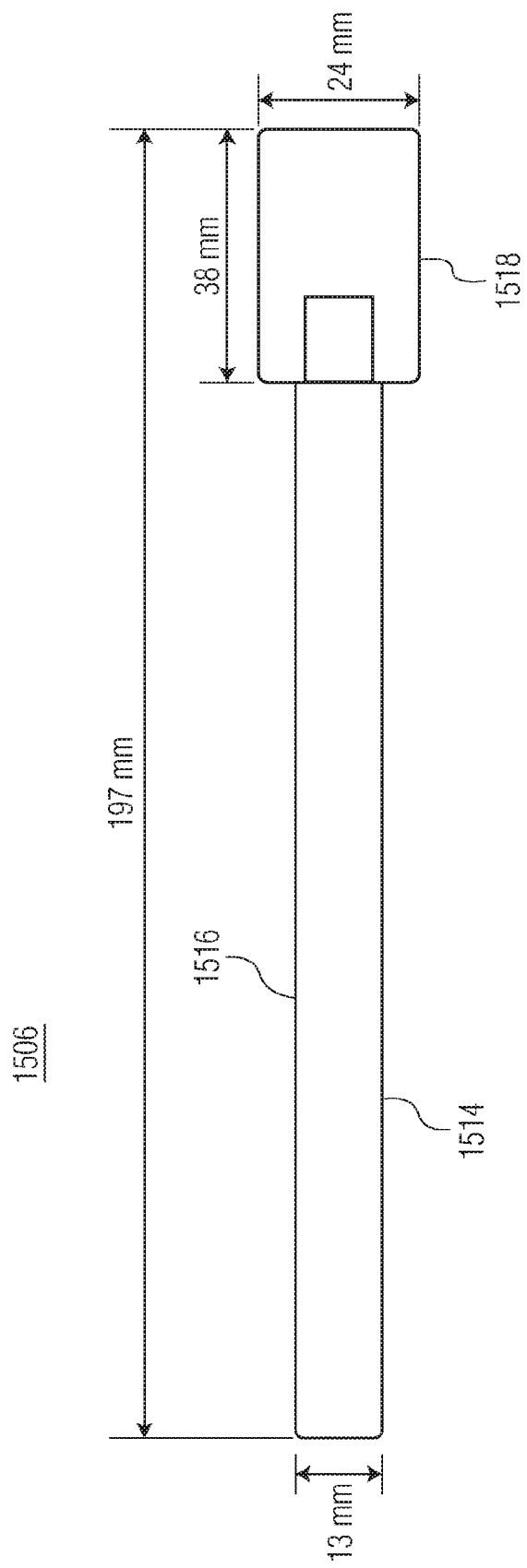
FIG. 18 depicts a side view of the side injection device depicted in FIG. 15.

FIG. 18 depicts a side view of the side injection device 1506 with some example dimensions. As shown in FIG. 18, the overall length of the body 1508 of the side injection device 1506 is 197 millimeters (mm). The plate 1518 has a dimension of 24×38 mm while the width of the neck 1516 and the head 1514 of the body 1508 is 13 mm. Although some examples of the dimensions of the side injection device 1506 are provided, the dimensions of the side injection device 1506 can be at any suitable value and are not limited to the examples provided.

Although specific embodiments of the invention that have been described or depicted include several components described or depicted herein, other embodiments of the invention may include fewer or more components to implement less or more feature.

In addition, although specific embodiments of the invention have been described and depicted, the invention is not to be limited to the specific forms or arrangements of parts so described and depicted. The scope of the invention is to be defined by the claims appended hereto and their equivalents.

What is claimed is:

1. An apparatus comprising:
   a light adjustment sheet that comprises electrical insulation exterior layers, electrical conductive interior layers, and a light adjustment layer that is located between the electrical conductive interior layers, the light adjustment sheet having a first major external surface and a second major external surface;
   a power source interface configured to be connected to a power source; and
   a sheet interface electrically connected to the power source interface, wherein the sheet interface is configured to connect to the light adjustment sheet such that electricity can be conducted from the power source interface to the light adjustment sheet to switch the light adjustment sheet between different visibility states;

wherein the sheet interface comprises a first tape-type conductive interface attached and/or adhered to the first major external surface of the light adjustment sheet and a second tape-type conductive interface attached and/or adhered to the second major external surface of the light adjustment sheet; and wherein the first tape-type conductive interface passes through a respective one of the electrical insulation exterior layers of the light adjustment sheet to make a conductive connection to a respective one of the electrical conductive interior layers and wherein the second tape-type conductive interface passes through a respective one of the electrical insulation exterior layers of the light adjustment sheet to make a conductive connection to a respective one of the electrical conductive interior layers.

2. The apparatus of claim 1, wherein the electrical insulation exterior layers are made of a material that is selected from the group consisting of glass, Polyester (PES), Polyethylene terephthalate (PET), Polyethylene (PE), High-density polyethylene (HDPE), Polyvinyl chloride (PVC), Polyvinylidene chloride (PVDC), Low-density polyethylene (LDPE), Polypropylene (PP), Polystyrene (PS), High impact polystyrene (HIPS), Polyamides (PA), Acrylonitrile butadiene styrene (ABS), Polyethylene/Acrylonitrile Butadiene Styrene (PE/ABS), Polycarbonate (PC), Polycarbonate/Acrylonitrile Butadiene Styrene (PC/ABS), and Polyurethanes (PU), wherein the electrical conductive interior layers are made of Indium Tin Oxide (ITO), Zinc oxide (ZnO) or graphene, and wherein the light adjustment layer is made of Polymer dispersed liquid crystal (PDLC), electrochromic material, Suspended particle device (SPD) material, or liquid-crystal display (LCD).

3. The apparatus of claim 1, wherein the power source interface comprises a socket to which a power cable is connected.

4. The apparatus of claim 1, wherein the sheet interface is configured to be connected to the light adjustment sheet by a user.

5. An apparatus comprising:

a light adjustment sheet that comprises electrical insulation exterior layers, electrical conductive interior layers, and a light adjustment layer that is located between the electrical conductive interior layers, the light adjustment sheet having a first major external surface formed by a first electrical insulation exterior layer and a second major external surface formed by a second electrical insulation exterior layer;

a power source interface configured to be connected to a power source; and a sheet interface electrically connected to the power source interface, wherein the sheet interface is configured to connect to the light adjustment sheet such that electricity can be conducted from the power source interface to the light adjustment sheet to switch the light adjustment sheet between different visibility states;

wherein the sheet interface comprises:

a first tape-type conductive interface attached and/or adhered to the first major external surface of the light adjustment sheet, wherein the first tape-type conductive interface passes through the first electrical insulation exterior layer of the light adjustment sheet to make a conductive connection to a first electrical conductive interior layer; and a second tape-type conductive interface attached and/or adhered to the second major external surface of the light adjustment sheet, wherein the second tape-type conductive interface passes through the second electrical insulation exterior layer of the light adjustment sheet to make a conductive connection to a second electrical conductive interior layer;

wherein a first electrical cable of the power source interface is connected to an external surface of the first tape-type conductive interface; and wherein a second electrical cable of the power source interface is connected to an external surface of the second tape-type conductive interface.

* * * * *